US009426324B2

(12) United States Patent
Nakazawa et al.

(10) Patent No.: US 9,426,324 B2
(45) Date of Patent: Aug. 23, 2016

(54) PHOTOELECTRIC CONVERSION ELEMENT, IMAGE READING DEVICE, IMAGE FORMING APPARATUS, AND IMAGE READING METHOD

(71) Applicant: Ricoh Company, Ltd., Tokyo (JP)

(72) Inventors: Masamoto Nakazawa, Kanagawa (JP); Masaki Nagase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/789,600

(22) Filed: Jul. 1, 2015

(65) Prior Publication Data

US 2015/0304517 A1      Oct. 22, 2015

Related U.S. Application Data

(63) Continuation of application No. 14/301,488, filed on Jun. 11, 2014, now Pat. No. 9,100,533.

(30) Foreign Application Priority Data

Jun. 18, 2013   (JP) .................................. 2013-127858

(51) Int. Cl.
*H04N 1/04*     (2006.01)
*H04N 1/028*    (2006.01)
(Continued)

(52) U.S. Cl.
CPC ......... *H04N 1/02815* (2013.01); *H04N 1/0473* (2013.01); *H04N 1/1013* (2013.01); *H04N 1/1039* (2013.01)

(58) Field of Classification Search
CPC . H04N 5/2351; H04N 5/2352; H04N 5/2355; H04N 5/2256; H04N 5/2354; H04N 5/3696; G02B 23/2476; G01B 5/008; G01D 5/26; G01D 5/262; G01D 9/30; G03G 15/02; G03G 15/0291; G03G 15/1635
USPC ......... 358/475, 513, 524, 1.13, 1.6, 498, 509; 399/281, 104, 110, 119, 122, 151, 262, 399/274, 277, 320, 328, 329, 358, 45, 55, 399/66, 93; 382/107, 103, 104, 132, 144, 382/171, 173; 600/103, 109
See application file for complete search history.

(56) References Cited

U.S. PATENT DOCUMENTS 5,285,295 A      2/1994 Kai et al.
5,563,723 A  *  10/1996 Beaulieu ................ H04N 1/401
                                                                358/406

(Continued)

FOREIGN PATENT DOCUMENTS

| JP | 2010-206401 | 9/2010 |
| JP | 2011-205512 | 10/2011 |
| JP | 2014-138406 | 7/2014 |

*Primary Examiner* — Negussie Worku

(74) *Attorney, Agent, or Firm* — Oblon, McClelland, Maier & Neustadt, L.L.P.

(57) ABSTRACT

A photoelectric conversion element includes: a plurality of light receiving elements that are arranged in a main-scanning direction, are arranged in a sub-scanning direction according to colors of light to be received, and accumulates electric charge due to light exposure; and a plurality of AD conversion units that convert analog signals that indicate quantities of electric charge accumulated in the light receiving elements into digital signals are provide for each of groups each consisting of a predetermined number of pixels corresponding to the light receiving elements arranged in the sub-scanning direction. The AD conversion units convert the analog signals into the digital signals in an order in which the light receiving elements in the group are exposed to light. The light receiving elements constitute a correction unit that performs correction so as to reduce a difference relating to the timings in the sub-scanning direction.

12 Claims, 17 Drawing Sheets

(51) Int. Cl.
*H04N 1/10* (2006.01)
*H04N 1/047* (2006.01)

(56) References Cited

U.S. PATENT DOCUMENTS

| | | | |
|---|---|---|---|
| 5,894,527 A | 4/1999 | Endo | |
| 5,990,948 A * | 11/1999 | Sugiki | H04N 5/357 348/250 |
| 7,256,380 B2 | 8/2007 | Kamisuwa et al. | |
| 7,948,531 B2 * | 5/2011 | Tanizoe | H04N 5/365 250/208.1 |
| 8,269,867 B2 * | 9/2012 | Inada | H03M 1/1023 348/241 |
| 8,626,272 B2 * | 1/2014 | Avni | A61B 1/041 600/476 |
| 8,736,926 B2 | 5/2014 | Suzuki et al. | |
| 8,823,994 B2 | 9/2014 | Shimatani | |
| 8,891,140 B2 | 11/2014 | Ueda | |
| 8,908,245 B2 | 12/2014 | Nakazawa | |
| 8,947,746 B2 | 2/2015 | Nanbu | |
| 8,988,743 B2 | 3/2015 | Ueno et al. | |
| 9,041,380 B2 * | 5/2015 | Wakabayashi | H04N 5/335 323/313 |
| 9,149,175 B2 * | 10/2015 | Avni | A61B 1/00006 |
| 2002/0159100 A1 * | 10/2002 | Okutomi | H04N 1/1013 358/497 |
| 2005/0036178 A1 * | 2/2005 | Pai | H04N 1/1017 358/474 |
| 2007/0188638 A1 | 8/2007 | Nakazawa et al. | |
| 2008/0231918 A1 | 9/2008 | Nagase | |
| 2008/0252787 A1 | 10/2008 | Nakazawa et al. | |
| 2008/0297616 A1 | 12/2008 | Nagase et al. | |
| 2009/0059324 A1 | 3/2009 | Nagase et al. | |
| 2009/0213261 A1 | 8/2009 | Nagase et al. | |
| 2009/0303358 A1 * | 12/2009 | Kawahito | H03M 1/1245 348/255 |
| 2010/0020211 A1 * | 1/2010 | Inada | H03M 1/1023 348/294 |
| 2010/0027061 A1 | 2/2010 | Nakazawa | |
| 2010/0171998 A1 | 7/2010 | Nakazawa | |
| 2010/0231979 A1 | 9/2010 | Nagase et al. | |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2011/0134446 A1 * | 6/2011 | Lee | H04N 1/40056 358/1.6 |
| 2011/0299144 A1 | 12/2011 | Yoshimoto et al. | |
| 2012/0008173 A1 | 1/2012 | Konno et al. | |
| 2012/0026370 A1 | 2/2012 | Oike et al. | |
| 2012/0057210 A1 | 3/2012 | Tsukahara et al. | |
| 2012/0062962 A1 | 3/2012 | Nagase | |
| 2012/0092732 A1 | 4/2012 | Nakazawa | |
| 2012/0224205 A1 | 9/2012 | Nakazawa | |
| 2013/0044338 A1 | 2/2013 | Nikaku | |
| 2013/0063792 A1 | 3/2013 | Nakazawa | |
| 2013/0170000 A1 * | 7/2013 | Kurakata | H04N 1/04 358/461 |
| 2014/0029065 A1 | 1/2014 | Nakazawa | |
| 2014/0036118 A1 * | 2/2014 | Dowaki | H04N 5/2173 348/294 |
| 2014/0078532 A1 | 3/2014 | Nikaku | |
| 2014/0092445 A1 | 4/2014 | Ishido | |
| 2014/0204427 A1 | 7/2014 | Nakazawa | |
| 2014/0270828 A1 * | 9/2014 | Suzuki | G03G 15/065 399/55 |

* cited by examiner

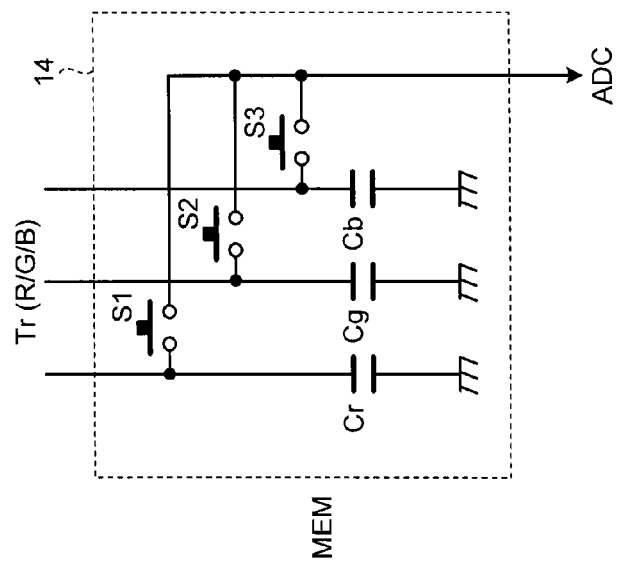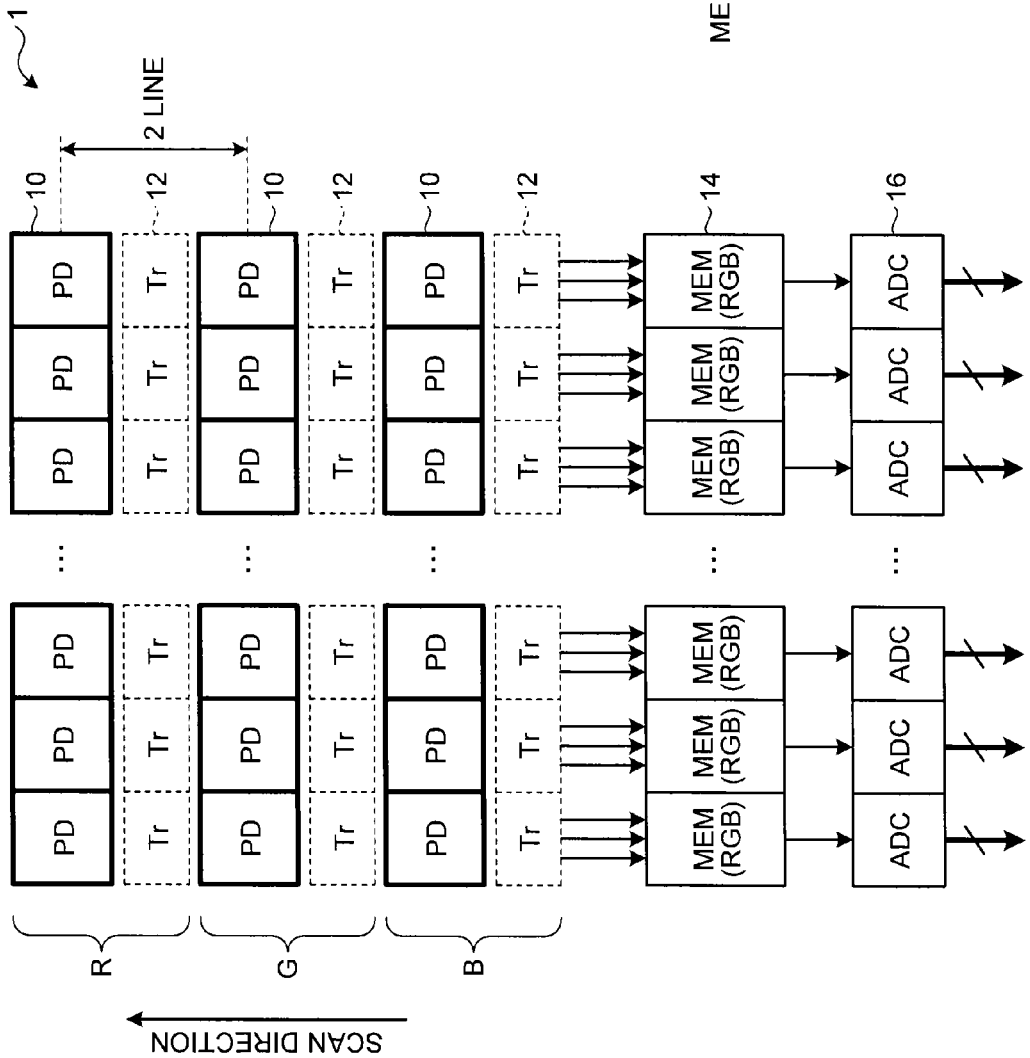

PHOTOELECTRIC CONVERSION ELEMENT, IMAGE READING DEVICE, IMAGE FORMING APPARATUS, AND IMAGE READING METHOD

CROSS-REFERENCE TO RELATED APPLICATIONS

The present application is a continuation of U.S. Ser. No. 14/301,488, filed Jun. 11, 2014, which claims priority under 35 U.S.C. 119 to Japanese Patent Application No. 2013-127858 filed in Japan on Jun. 18, 2013. The entire contents of the above applications are incorporated herein by reference.

BACKGROUND OF THE INVENTION

1. Field of the Invention

The present invention relates to a photoelectric conversion element, an image reading device, an image forming apparatus, and an image reading method.

2. Description of the Related Art

Known image reading devices, such as scanners, include a photoelectric conversion element that performs a photoelectric conversion on light that is reflected by an original document; an analog processing unit that performs an operation for an AD conversion on an analog signal output from the photoelectric conversion element; and an image correction unit that performs various corrections on image data that has been converted into digital signals. Conventionally, CCDs are often used as the photoelectric conversion element; however, CMOS linear image sensors have been recently popular due to the demands for a higher speed and a lower electric power. Nowadays, it is known that a plurality of pixels is treated as one group (column) of pixels and a processing circuit is provided for each column.

However, conventional CMOS linear image sensors, which perform an operation on a per-column basis, need to temporarily hold analog signals and sequentially read them according to a one-shot exposure method. To hold an analog signal, an element needs to have capacitances depending on the holding time. Specifically, there is a problem that it is difficult to reduce the size of CMOS linear image sensors. Furthermore, conventional CMOS linear image sensors have a problem that, if an analog signal is not held according to a sequential exposure method, the image quality is degraded due to a color shift and/or the like.

In consideration of the foregoing, there is a need to provide a photoelectric conversion element, an image reading device, an image forming apparatus, and an image reading method to achieve both a reduction in the size of an element and a prevention of a degradation in the image quality.

SUMMARY OF THE INVENTION

It is an object of the present invention to at least partially solve the problems in the conventional technology.

A photoelectric conversion element includes: a plurality of light receiving elements that are arranged in a main-scanning direction, are arranged in a sub-scanning direction according to colors of light to be received, and accumulates electric charge due to light exposure; and a plurality of AD conversion units that convert analog signals that indicate quantities of electric charge accumulated in the light receiving elements into digital signals are provide for each of groups each consisting of a predetermined number of pixels corresponding to the light receiving elements arranged in the sub-scanning direction. When the light receiving elements are exposed to light at different timings in the sub-scanning direction between the pixels in the group and accumulate electric charge, the AD conversion units convert the analog signals into the digital signals in an order in which the light receiving elements are exposed to light. The light receiving elements constitute a correction unit that performs correction so as to reduce a difference relating to the timings in the sub-scanning direction.

An image reading device includes a photoelectric conversion element as described above.

An image reading method includes: causing a plurality of light receiving elements to be exposed to light at different timings in a sub-scanning direction so as to accumulate electric charge, the light receiving elements being arranged in a main-scanning direction and being arranged in the sub-scanning direction according to colors of light to be received; converting, by using a plurality of AD conversion units, analog signals that indicate quantities of electric charge accumulated in the light receiving elements into digital signals for each of groups each consisting of a predetermined number of pixels corresponding to the light receiving elements arranged in the sub-scanning direction in an order in which the light receiving elements are exposed to light for the respective pixels in the group; and performing correction so as to reduce a difference relating to the timings in the sub-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are diagrams that illustrate a configuration of a photoelectric conversion element that implements a one-shot exposure method where an AD conversion is performed for each group of pixels;

DETAILED DESCRIPTION OF THE PREFERRED EMBODIMENTS

Figure 2:
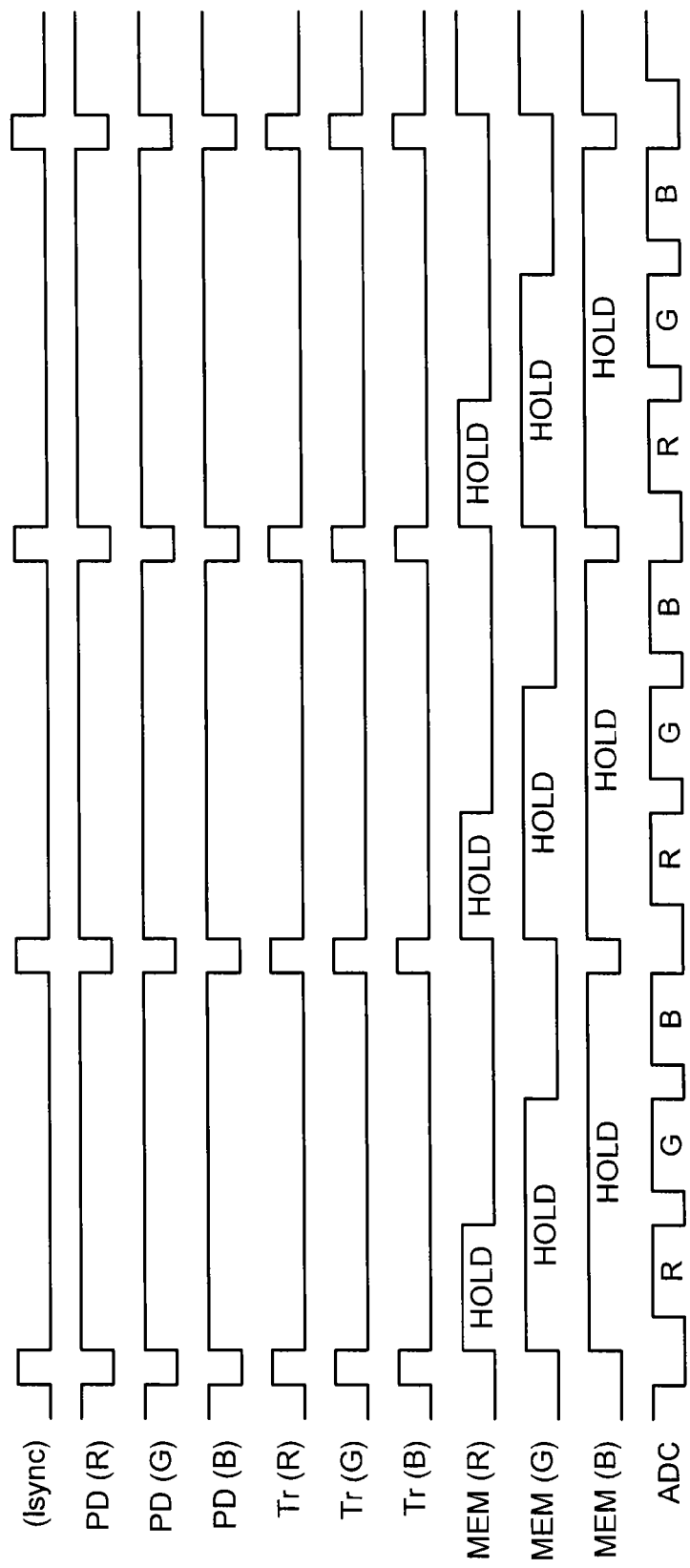
FIG. 2 is a timing chart that illustrates an operation of the photoelectric conversion element illustrated in FIGS. 1A and 1B.

First, the background in which the present invention has been made is described. CMOS linear image sensors are the same as CCDs in that they perform a photoelectric conversion on incident light by using a photo diode. However, they are different from each other in that CCDs transfer electric charge by using a shift register and, after the transfer, perform a charge-voltage conversion by using an electric-charge detection unit, while CMOS sensors perform a charge-voltage conversion in the vicinity of a pixel and output it to a subsequent stage. Furthermore, as the CMOS sensor can be manufactured during a CMOS process (an NMOS process for the CCD), it may include a built-in logic circuit and a built-in AD converter. Moreover, although the CCD sequentially outputs image signals by electric-charge transfer, the CMOS sensor sequentially outputs image signals by changing switches that are connected to respective pixels.

Furthermore, in recent years, there have been known column-type photoelectric conversion elements where a plurality of pixels is treated as one group (column) of pixels and an AD converter or other processing circuits are formed for each column. FIGS. 1A and 1B are diagrams that illustrate a configuration of a photoelectric conversion element 1 that uses a one-shot exposure method where an AD conversion is performed for each group of pixels. FIG. 1A illustrates the photoelectric conversion element 1 in a case where one column includes one pixel for each of R, G, and B and three pixels in total that are arranged in the sub-scanning direction. The photoelectric conversion element 1 is a CMOS linear image sensor, and it includes, for example, a light receiving element (photo diode: PD) 10 that receives light and a pixel circuit (Tr) 12 for each of 7000 pixels that are arranged in the main-scanning direction of an image reading device. Furthermore, the light receiving elements 10 and the pixel circuits 12 are arranged in three rows in the sub-scanning direction of the image reading device to receive light of R, G, and B. Moreover, the interval between the light receiving elements 10 for R-G and for G-B in the sub-scanning direction corresponds to a two line pitch on an original document that is read by the image reading device.

As illustrated in FIG. 1A, an analog memory (MEM) 14 and an AD conversion unit (ADC) 16 are provided for each column. FIG. 1B is a diagram that illustrates a configuration of the analog memory 14. The analog memory 14 includes capacitors Cr, Cg, and Cb for the colors and, by changing switches S1 to S3, sequentially stores an analog image signal for each color. The AD conversion unit 16 converts the analog image signals for the colors that are sequentially stored in the analog memory 14 into digital image signals.

In the photoelectric conversion element 1, according to the light to which the light receiving element 10 for each of R, G, and B is exposed, a quantity of electric charge is accumulated due to a photoelectric conversion and, after a charge-voltage conversion, it is transferred to the pixel circuit 12 as a voltage image signal. The pixel circuit 12 includes a switch or buffer (not illustrated) to transfer the image signal that is input from the light receiving element 10.

Each of the R, G, and B analog image signals output from the pixel circuits 12 is written in the analog memory 14. The image signal written in the analog memory 14 is sequentially read by the AD conversion unit 16 and is subjected to an A/D conversion. After the A/D conversion, the digital image data is stored in an undepicted line memory and, after it is subjected to a parallel-serial conversion, the serial image data on all of the pixels is output to a subsequent stage.

Here, the analog memory 14 needs to hold an analog image signal until an A/D conversion is started. The period during which the analog memory 14 holds an analog image signal is about the period of one line at a maximum and, in terms of time, it is a few dozen to a few hundred μs, for example. Therefore, the capacitance value of the analog memory 14 needs to be high, i.e., a few hundred F to a few dozen pF (it is significantly high as the capacitor that is formed on a semiconductor chip). Specifically, there is a problem that, because the circuit size of the analog memory 14 is large, the area of the light receiving element 10 needs to be decreased and the aperture ratio is reduced, or a problem that, because of an increase in the size of an element (the size of a chip), the manufacturing costs are increased.

Although an explanation is given of the photoelectric conversion element 1 in a case where an image is read in the order of R→G→B, the order is not limited to this. Furthermore, the scan direction is the direction in which the photoelectric conversion element 1 moves relative to an original document while reading an image (a direction relative to an original document). A unit that has substantially the same configuration as that of a unit included in the photoelectric conversion element 1 is denoted below by the same reference numeral.

FIG. 2 is a timing chart that illustrates an operation of the photoelectric conversion element 1 illustrated in FIGS. 1A and 1B. The light receiving element 10 is exposed to light during a period (PD="H" period) almost corresponding to the period for scanning one line. Furthermore, the exposure timings of the R, G, and B light receiving elements 10 are the same. Thus, the photoelectric conversion element 1 achieves a one-shot exposure of all of the pixels.

After the light exposure of the light receiving element 10 is completed, the photoelectric conversion element 1 transfers the accumulated electric charge to the pixel circuit 12 (Tr="H" period). The R, G, and B analog image signals are written in the analog memory 14. The analog memory 14 holds the analog image signal until an A/D conversion is completed for each signal (MEM="H (Hold)"). The analog image signal held by the analog memory 14 is read by the AD conversion unit 16 and is subjected to an A/D conversion in the order of R→G→B.

As illustrated in FIG. 2, the photoelectric conversion element 1 performs a parallel operation on a pixel by pixel basis after the light exposure of the light receiving element 10 is started and until writing is performed by the analog memory 14, and operations from reading of an analog image signal from the analog memory 14 until an AD conversion are performed as serial operations within a group (column) of pixels.

The period during which the R analog image signal is held by the analog memory 14 is shortest, the R analog image signal being first subjected to an A/D conversion. Conversely, as for the B analog image signal that is subjected to an A/D conversion at last, it needs to be held the longest and during the period of almost about one line. Although not illustrated in FIGS. 1A and 1B, lsync is a synchronization signal for scanning one line.

Figure 3:
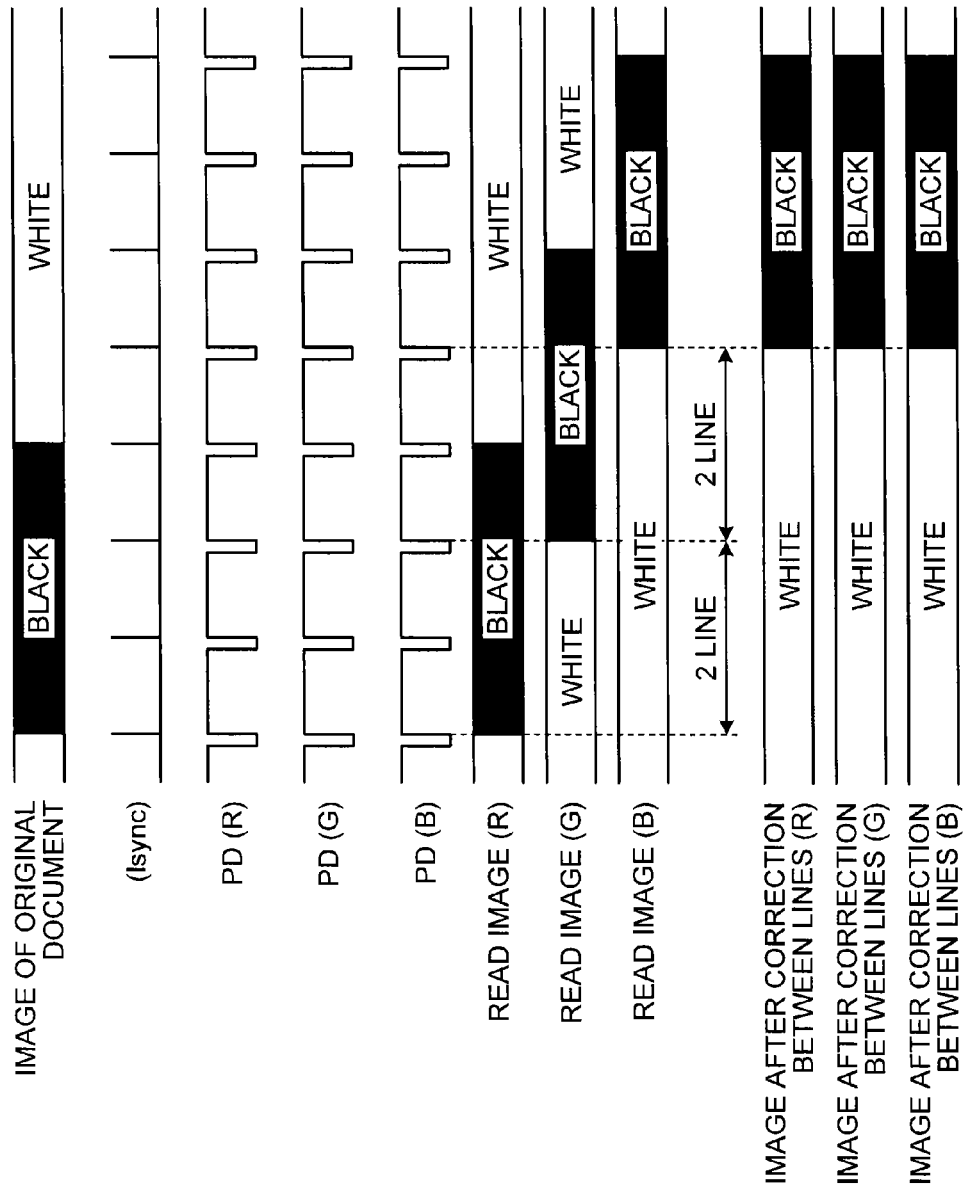
FIG. 3 is a diagram that illustrates an operation performed by the photoelectric conversion element to read an image by using a one-shot exposure method.

FIG. 3 is a diagram that illustrates an operation performed by the photoelectric conversion element 1 to read an image by using a one-shot exposure method. In the photoelectric conversion element 1, all of the R, G, and B pixels are exposed to light at the same timing according to the one-shot exposure method. As illustrated in FIG. 3, if an original document is black→white, the R image read by the R light receiving element 10 becomes black→white in accordance with the original document. As illustrated in FIG. 1A, an interval of the G light receiving element 10 from the R light receiving element 10 corresponds to two lines. Therefore, the G light receiving element 10 reads black→white of the original document after a delay of two lines compared to the R light receiving element 10. Furthermore, the B light receiving element 10 also has an interval of two lines from the G light receiving element 10 (an interval of four lines from the R light receiving element 10); therefore, it reads black→white of the original document after a delay of two lines compared to the G light receiving element 10.

Here, as the G/B light receiving element 10 is shifted from the R light receiving element 10 by two lines/four lines in the sub-scanning direction, the original document is read such that the G/B read image is delayed two lines/four lines compared to the R read image. However, as the exposure timings for R, G, and B are the same, the locations of the original document that are read by the respective R, G, and B pixels are equivalent (it means that the equivalent location of the original document is read at different timings).

With respect to the images that are read by the R, G, and B light receiving elements 10, an image processing unit (not illustrated), which is provided at the subsequent stage, corrects an electric delay of the read images due to the interval between lines (correction between lines); therefore, after the correction, the image in which the timing is consistent between R, G, and B can be obtained.

To simplify explanations, an example is given in FIG. 3 where the boundary between white and black of the original document is identical to the boundary between the read lines and Modulation Transfer Function (MTF) is in an ideal state. Actually, due to the MTF, an area before or after the boundary between black→white is read as an intermediate color (gray) of black and white. Furthermore, in this example, the scan direction is such that an original document is read in the order of R→G→B.

Figure 4:
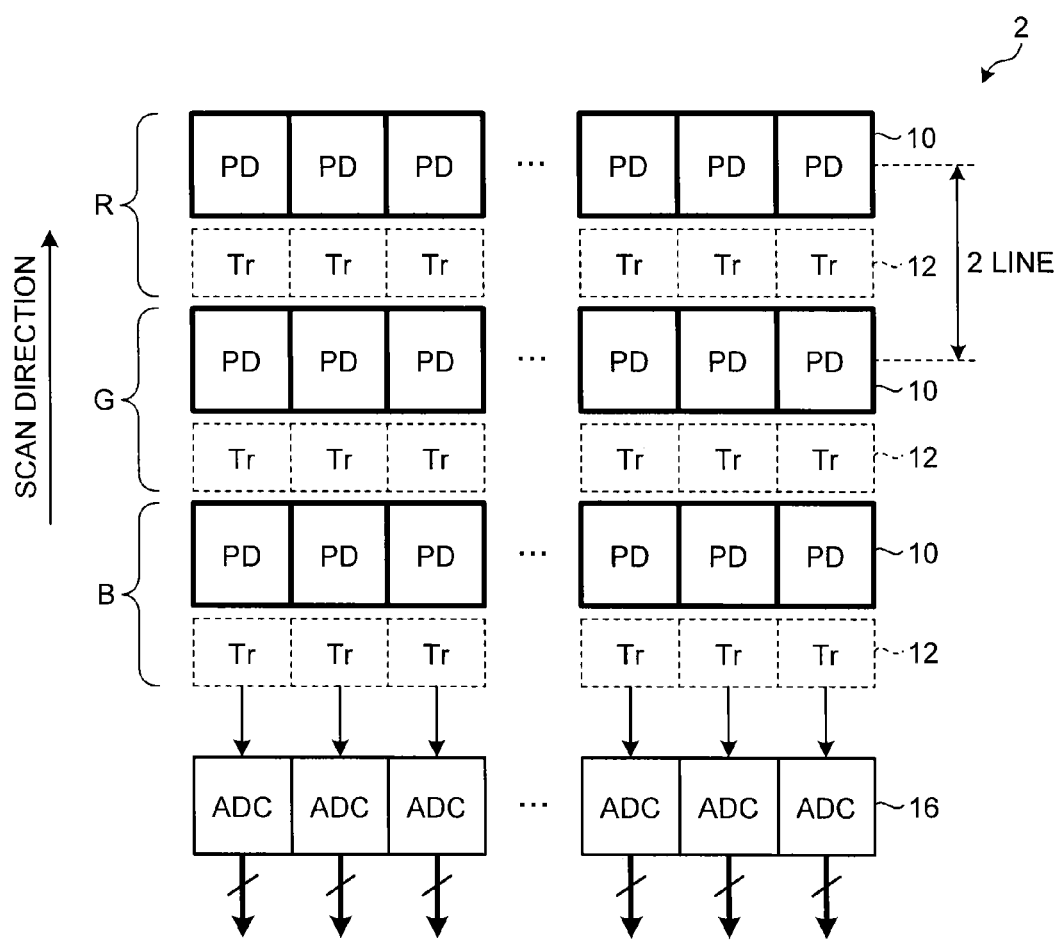
FIG. 4 is a diagram that illustrates a configuration of a photoelectric conversion element that implements a sequential exposure method where an AD conversion is performed for each group of pixels.

FIG. 4 is a diagram that illustrates a configuration of a photoelectric conversion element 2 that implements a sequential exposure method where an AD conversion is performed for each group of pixels. Contrary to the photoelectric conversion element 1 that implements the one-shot exposure method illustrated in FIGS. 1A and 1B, the photoelectric conversion element 2 illustrated in FIG. 4 does not need an analog memory (the analog memory 14 of FIGS. 1A and 1B) as it implements a sequential exposure method. The photoelectric conversion element 2 is the same as the photoelectric conversion element 1 illustrated in FIGS. 1A and 1B except that it does not include the analog memory 14, and also consisting of groups of pixels each including, as a unit, one pixel for each of R, G, and B and three pixels in total.

With the sequential exposure method, the pixels are sequentially subjected to an A/D conversion in the order in which the pixels are exposed to light; therefore, an analog memory is not necessary. Conversely, to sequentially perform an A/D conversion, it is necessary to shift the exposure timings for the pixels from each other in a column.

Figure 5:
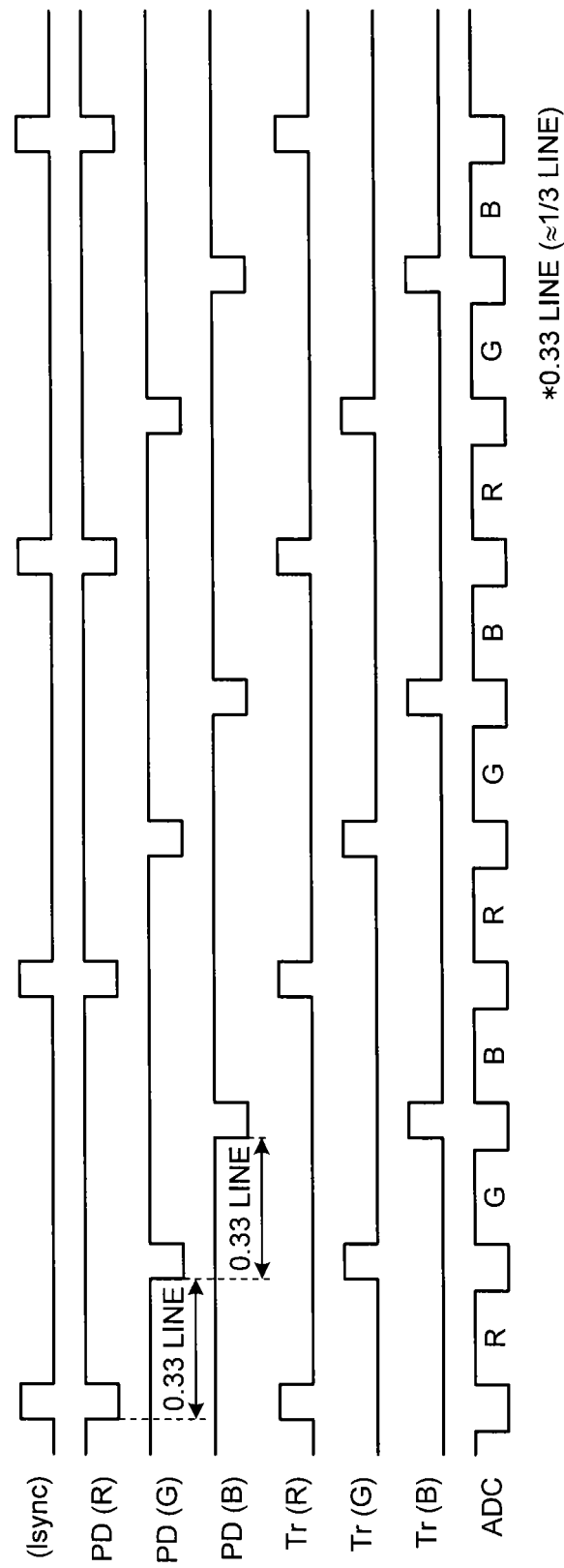
FIG. 5 is a timing chart that illustrates an operation of the photoelectric conversion element illustrated in FIG. 4.

FIG. 5 is a timing chart that illustrates an operation of the photoelectric conversion element 2 illustrated in FIG. 4. As is the case with the example of the operation illustrated in FIG. 2, the light receiving element 10 is exposed to light during a period (PD="H" period) substantially corresponding to the period for scanning one line. However, the exposure timings of the R, G, and B light receiving elements 10, i.e., PD(R), PD(G), and PD(B), are different. Here, the exposure times for R, G, and B are shifted by ⅓ line≈0.33 lines from each other.

When the light exposure for each of the light receiving elements 10 is completed, the accumulated electric charge is transferred to the pixel circuit 12 (Tr="H" period) and is then transferred to the AD conversion unit 16 for an A/D conversion. This process is sequentially performed by the photoelectric conversion element 2 in the order of R→G→B.

Figure 6:
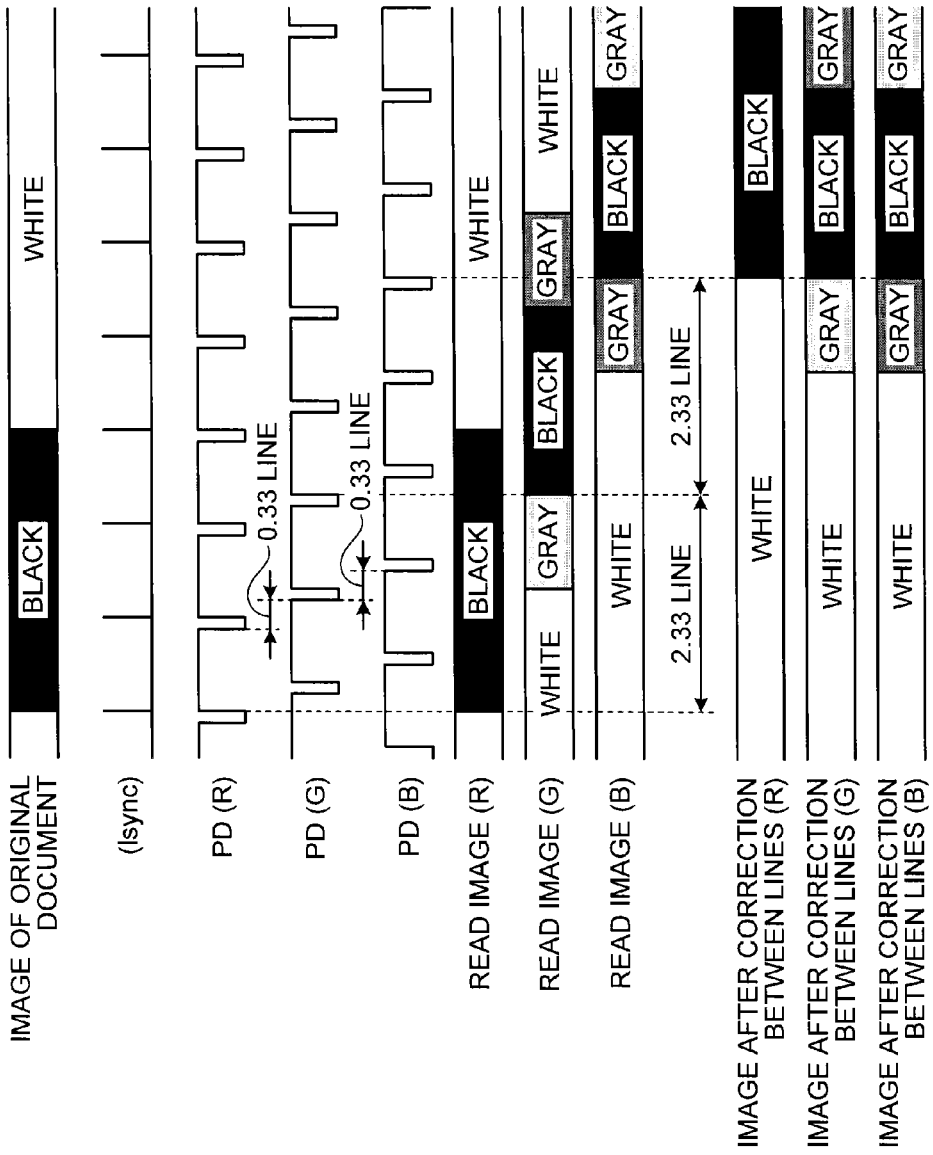
FIG. 6 is a diagram that illustrates an operation performed by the photoelectric conversion element to read an image by using the sequential exposure method.

FIG. 6 is a diagram that illustrates an operation performed by the photoelectric conversion element 2 to read an image by using the sequential exposure method. With the sequential exposure method, unlike the operation illustrated in FIG. 3, the R, G, and B light receiving elements 10 are exposed to light at different read positions.

As illustrated in FIG. 6, if the original document is black→white, the R image read by the R light receiving element 10 becomes black→white in accordance with the original document. As illustrated in FIG. 4, the G light receiving element 10 has an interval of two lines from the R light receiving element 10. However, as illustrated in FIG. 5, the G light receiving element 10 is exposed to light at the exposure time that is delayed about 0.33 (⅓) lines with respect to the R light receiving element 10. Therefore, the G light receiving element 10 is reads the location of the original document that is delayed about 1.67 lines, i.e., after about 0.33 lines compared to the R image.

Therefore, although the R light receiving element 10 is capable of distinctively reading the boundary between black-white, the G light receiving element 10 reads white just before the boundary in the original document as gray (light gray) as illustrated in FIG. 6. This is because a delay of the exposure time corresponds to about 0.33 lines and therefore what is to read white is exposed to light with a mixture of black of an amount corresponding to about 0.33 lines.

Furthermore, the B light receiving element 10 physically has an interval of two lines from the G light receiving element 10 (an interval of four lines from the R light receiving element 10). A delay of the exposure time of the B light receiving element 10 compared to the G light receiving element 10 corresponds to about 0.33 lines (about 0.66 lines compared to the R light receiving element 10). Therefore, the B light receiving element 10 reads an image at the position after a delay of about 1.67 lines compared to the G light receiving element 10 (3.34 lines compared to the R image) and, as is the case with the G light receiving element 10, it reads the area near a boundary in the original document as gray (dark gray) due to the delay of the exposure time. Specifically, in addition to a shift of the physical pixel locations of the G/B pixels with respect to the R pixel by two lines/four lines in the sub-scanning direction, a difference between the exposure times for R, G, and B causes the locations that are read by the RGB pixels in the original document to be different from one another.

With regard to the images that are read by each of the R, G, and B light receiving elements 10, the image processing unit (not illustrated), which is provided at the subsequent stage, corrects a delay (electric delay) of the read images due to the line interval; however, even after correction, the timings for R, G, and B are not consistent. Therefore, a problem occurs in that, at the boundary between black and white, G/B reads gray, i.e., a color shifted image (a colored image), and does not properly read an image of an original document (they do not read the same original document in a strict sense).

If a read position shift that occurs between RGB images is the integral multiple of a line pitch, only timings of reading the original document are different. That is, the locations of the original document that are read by the R, G, and B light receiving elements 10 (in a strict sense, the objects that are read by R, G, and B) are equivalent. Therefore, a shift corresponding to an integral number of lines can be easily by adjusting an electric delay generally with a FIFO memory.

However, in the case of a shift that is not the integral multiple of the line pitch (a shift of a decimal number of lines), the read objects are essentially different; therefore, even if the timings are adjusted between the R, G, and B images, it is impossible to easily correct the difference in the image between the colors. Specifically, to prevent the above-described problem of a color shift, the difference between the positions of the images that are read by the R, G, and B light receiving elements 10 at least needs to be set to the integral multiple of the line pitch.

To simplify explanations, also in FIG. 6, an example is given where the boundary between white and black of an original document is identical to the boundary between the R read lines and the MTF is in an ideal state.

First Embodiment

Figure 7:
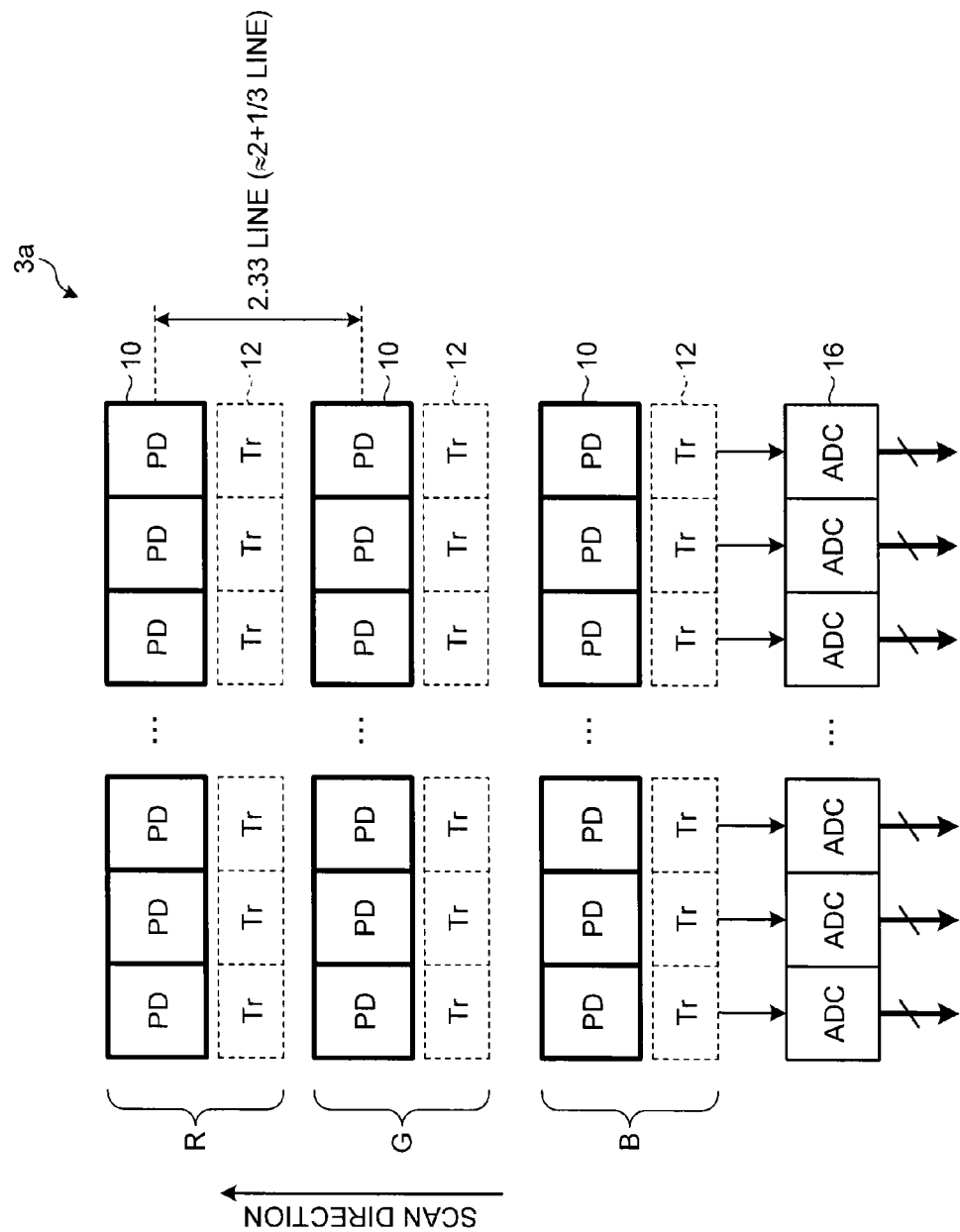
FIG. 7 is a diagram that illustrates a configuration of a photoelectric conversion element according to a first embodiment.

FIG. 7 is a diagram that illustrates a configuration of a photoelectric conversion element 3a according to a first embodiment. The color shift illustrated in FIG. 6 occurs due to the difference between the R, G, and B exposure timings, and it can be considered that the physical pixel location and the exposure timing equally affects the read position of an original document in the image reading device, i.e., they are equivalent. Therefore, the photoelectric conversion element 3a according to the first embodiment is configured to offset the difference in the exposure time among the R, G, and B in the sequential exposure method by the relative position of pixels.

The photoelectric conversion element 3a illustrated in FIG. 7 has substantially the same configuration as that of the photoelectric conversion element 2 illustrated in FIG. 4; however, they are different from each other in that the interval among the R, G, and B pixels is an about 2.33-line pitch in the sub-scanning direction. That is, as the shift between read images depends on the difference between a shift of the physical position and a delay of the exposure time, the delay (about 0.33 lines) of the exposure time is offset by the difference between the physical pixel locations (+about 0.33 lines). Therefore, even if the exposure timings are different, the shift of the R, G, and B read positions can be made correspond to two lines as in the case illustrated in FIG. 1A (obtained as an integral number of lines); thus, the problem of the color shift illustrated in FIG. 6 can be prevented.

The color shift (shift of the read position) occurs due to a movement of a read object (in the image reading device, an original document and a photoelectric conversion element are moved relative to each other), and this problem also occurs in area sensors (in area sensors, it occurs as a distortion of a moving image: a distortion of a focal plane). However, area sensors that are used for a video, or the like, capture moving images, or the like; therefore, the speed relationship between the area sensor and an object to be captured is not fixed. In contrast, an object that moves in a linear sensor (scanner) is a read carriage or an original document, and the velocity (reading linear velocity) is constant. That is, the technique according to the first embodiment can be implemented inherently in linear sensors in which the degree of color shift can be predicted.

Figure 8:
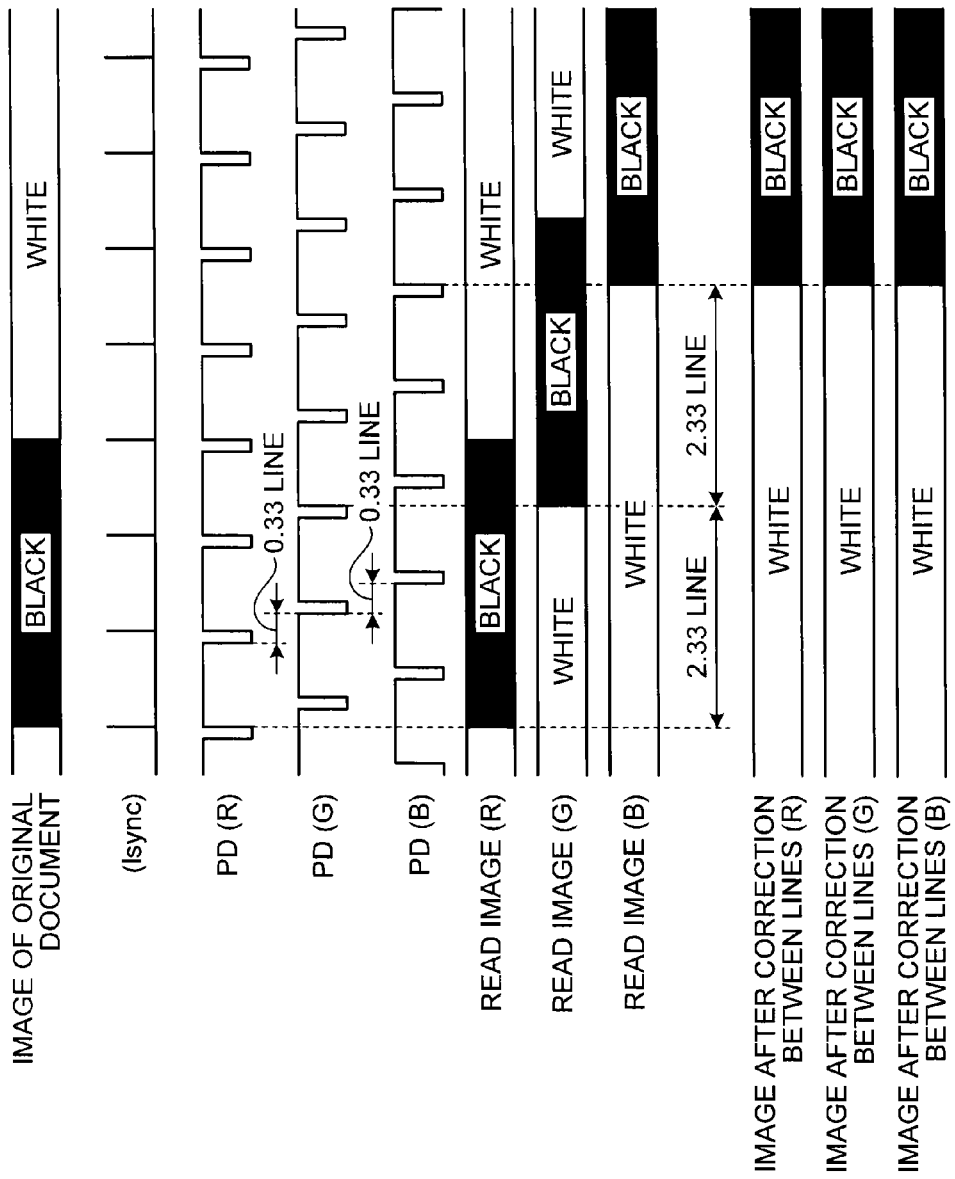
FIG. 8 is a diagram that illustrates an operation performed by the photoelectric conversion element to read an image.

FIG. 8 is a diagram that illustrates an operation performed by the photoelectric conversion element 3a to read an image. The electric timing of the G/B image with respect to the R image in the operation of the photoelectric conversion element 3a is the same as in the operation illustrated in FIG. 6. However, the delay of about 0.33 lines due to a delay of the exposure time is offset by the shift of the physical position (+about 0.33 lines) illustrated in FIG. 7. Therefore, even if there is the shift (about 1.67 lines) of the read position of the original document illustrated in FIG. 6, the shift between the positions where the R, G, and B light receiving elements 10 read the original document correspond to two lines. That is, the read position of the original document is the same as that in the example illustrated in FIG. 3. Therefore, the area near the boundary in an original document is not read as gray, and the occurrence of a color shift in the image obtained after the correction between lines can be prevented.

As described above, in the case of the sequential exposure method, the difference in the exposure time that occurs among the pixels of a column is offset by the physical pixel location so that the shift of the read position is the integral multiple of the line pitch (corresponding to the integral number of lines); therefore, the objects that are read by R, G, and B can be caused to be essentially the same, and the color shift can be prevented. While maintain the simultaneous exposure characteristics equivalent to that of the one-shot exposure method, pixels can be driven using the sequential exposure method; thus, it is made possible to omit an analog memory and to prevent an increase in the size of a chip and an increase in the manufacturing costs while obtaining the performance equivalent to the one-shot exposure method.

In FIG. 8, the difference in the exposure time among the R, G, and B is about 0.33 lines, and this means ⅓ line. In an image reading device, such as a scanner, the line period and the reading linear velocity (scan velocity) usually have one-to-one relationship; therefore, the location that is physically read in an original document depends on the ratio of the line period (for example, in the case of ⅓ line, it means that there is a shift that corresponds to ⅓ line regarding the distance on the surface of an original document). Therefore, the delay amount of a line due to the difference in the exposure time is caused to be always constant by setting the difference in the exposure time such that the ratio of the line period is constant regardless of the line period and it is possible to handle various line periods while the physical pixel location is maintained in the state illustrated in FIG. 7.

Second Embodiment

Figure 9:
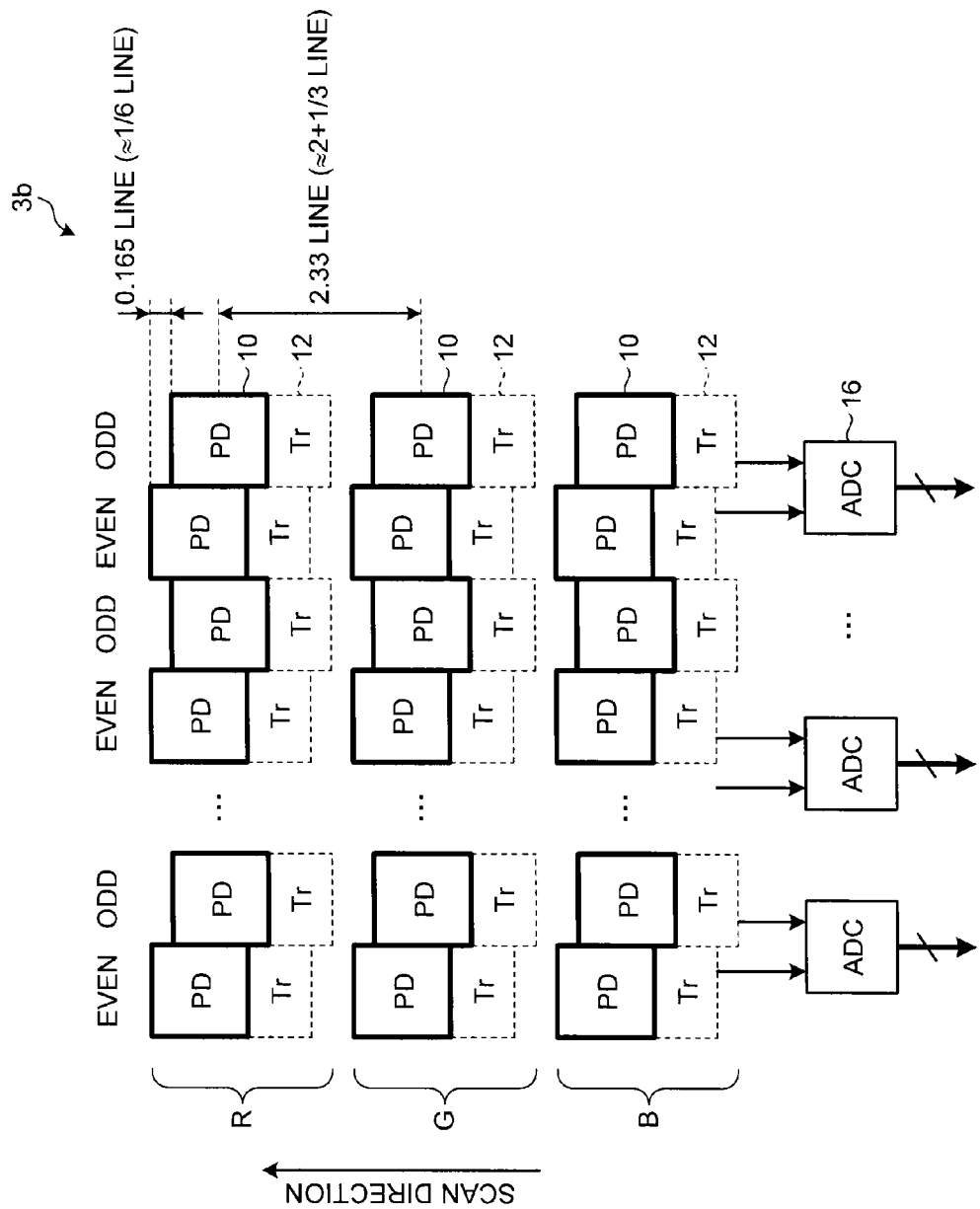
FIG. 9 is a diagram that illustrates a configuration of a photoelectric conversion element according to a second embodiment.

FIG. 9 is a diagram that illustrates a configuration of a photoelectric conversion element 3b according to a second embodiment. In the case illustrated in FIG. 7, a column includes one pixel for each of R, G, and B; however, in terms of the size of a circuit, the size becomes smaller if a column includes multiple pixels for each of R, G, and B. In the photoelectric conversion element 3b according to the second embodiment, a column includes two pixels for each of R, G, and B.

In the photoelectric conversion element 3b, the pixels of a column are configured such that two pixels of each of R, G, and B are distinguished as Even/Odd. The number of pixels within a column in the photoelectric conversion element 3b is increased from three pixels to six pixels compared with the photoelectric conversion element 3a; therefore, the difference in the exposure time is set to be shorter, i.e., from ⅓ to ⅙ line (≈0.165 lines) and, as for the physical pixel location, an Odd pixel is shifted from an Even pixel by about 0.165 lines (an Odd pixel may be shifted relative to an Even pixel by about 0.165 lines toward the upstream in the scan direction).

Figure 10:
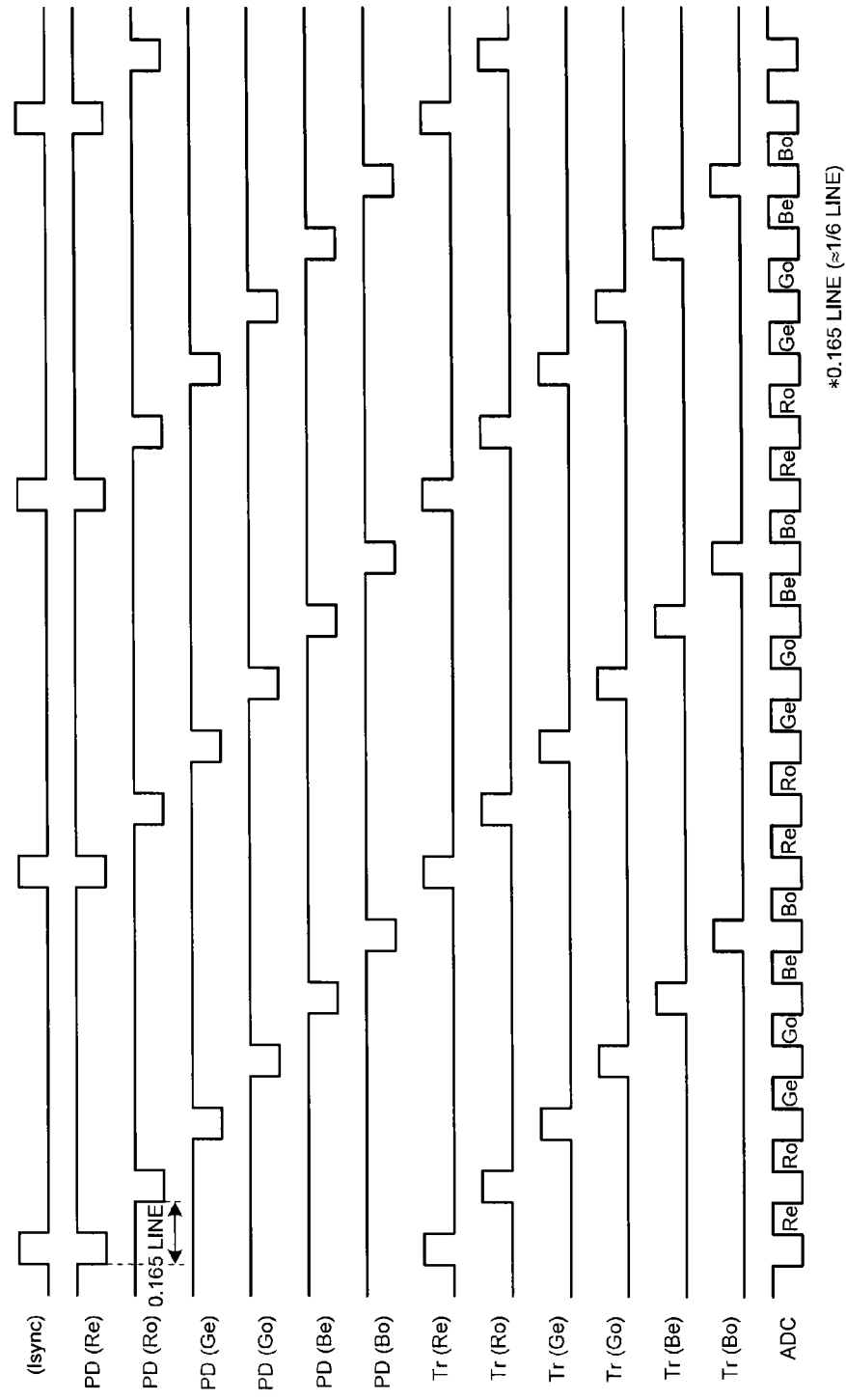
FIG. 10 is a timing chart that illustrates an operation of the photoelectric conversion element illustrated in FIG. 9.

FIG. 10 is a timing chart that illustrates an operation of the photoelectric conversion element 3b illustrated in FIG. 9. The operation performed when a column includes multiple pixels for each of R, G, and B is different in that the light receiving elements 10, the pixel circuits 12, and the AD conversion unit 16 are distinguished for Even/Odd, i.e., RGB→Re/Ro/Ge/Go/Be/Bo, and in that the difference in the exposure time among the pixels is about 0.165 lines (⅙ line). Otherwise, the operation is the same as that illustrated in FIG. 5. An operation for each pixel is sequentially performed in the order of Re→Ro→Ge→Go→Be→Bo.

Figure 11:
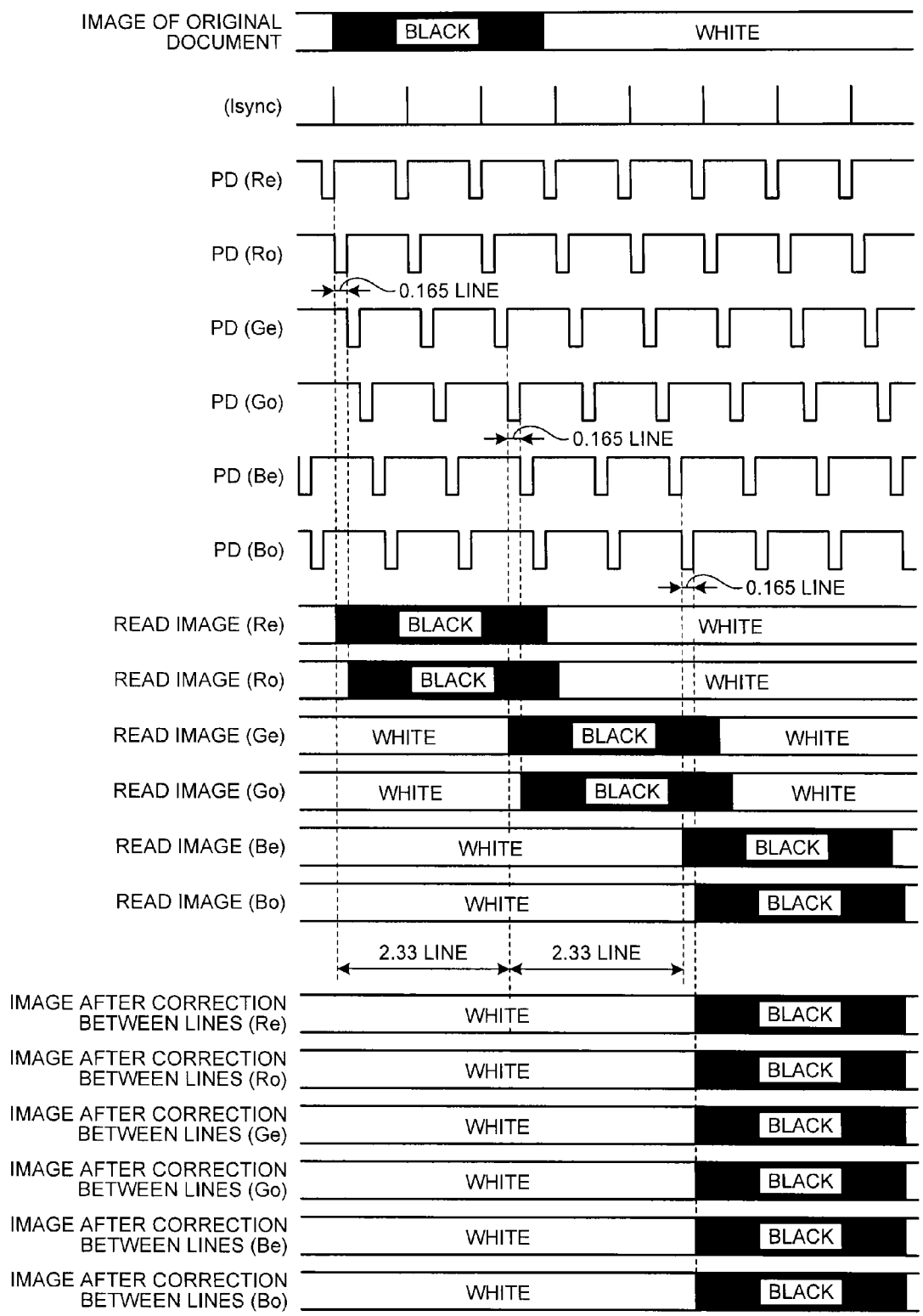
FIG. 11 is a diagram that illustrates an operation performed by the photoelectric conversion element to read an image.

FIG. 11 is a diagram that illustrates an operation performed by the photoelectric conversion element 3b to read an image. Even if a column includes multiple pixels for each of R, G, and B, the advantage is the same as that in the case of the operation illustrated in FIG. 8. When an original document is read, the delay (about 0.33 lines) in the exposure timing among R, G, and B is offset by the physical pixel location (+0.33 lines) illustrated in FIG. 9; therefore, the read positions of the R, G, and B light receiving elements 10 are caused to be equivalent. In the same manner, the delay (about 0.165 lines) in the exposure timing between Even-Odd is offset by the physical pixel location illustrated in FIG. 9, i.e., about +0.165 lines between Even-Odd; thus, the read positions (the positions in the sub-scanning direction) of Even-Odd are caused to be equivalent.

As described above, even if a column includes multiple pixels for each of R, G, and B, the objects (sub-scanning positions) that are read by RGB and Even/Odd can be also essentially the same. That is, a color shift or a pixel shift (a pixel shift occurs if the read positions of Even-Odd are different) can be prevented, and the same advantage as that of the operation illustrated in FIG. 8 can be provided.

For explanations, Even/Odd of the image read by the photoelectric conversion element 3b and the image obtained after the correction between lines are separately represented in FIG. 11; however, Even/Odd images are usually combined (not illustrated) by a photoelectric conversion element or a subsequent image processing unit.

Third Embodiment

Figure 12B:
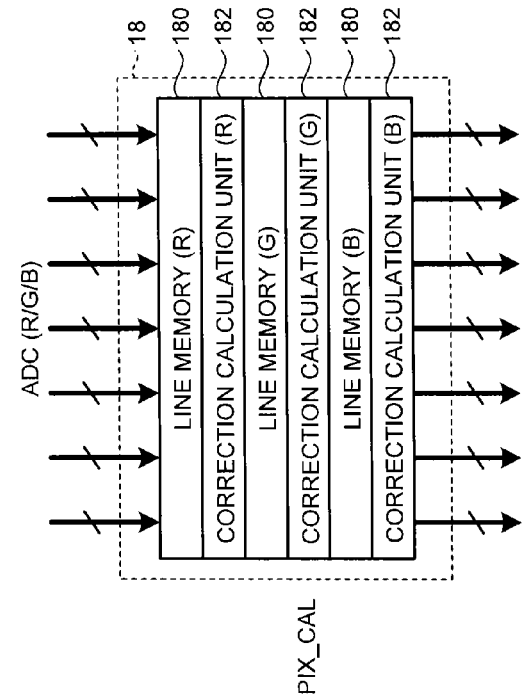
FIGS. 12A and 12B are diagrams that illustrate a configuration of a photoelectric conversion element according to a third embodiment.
Figure 12A:
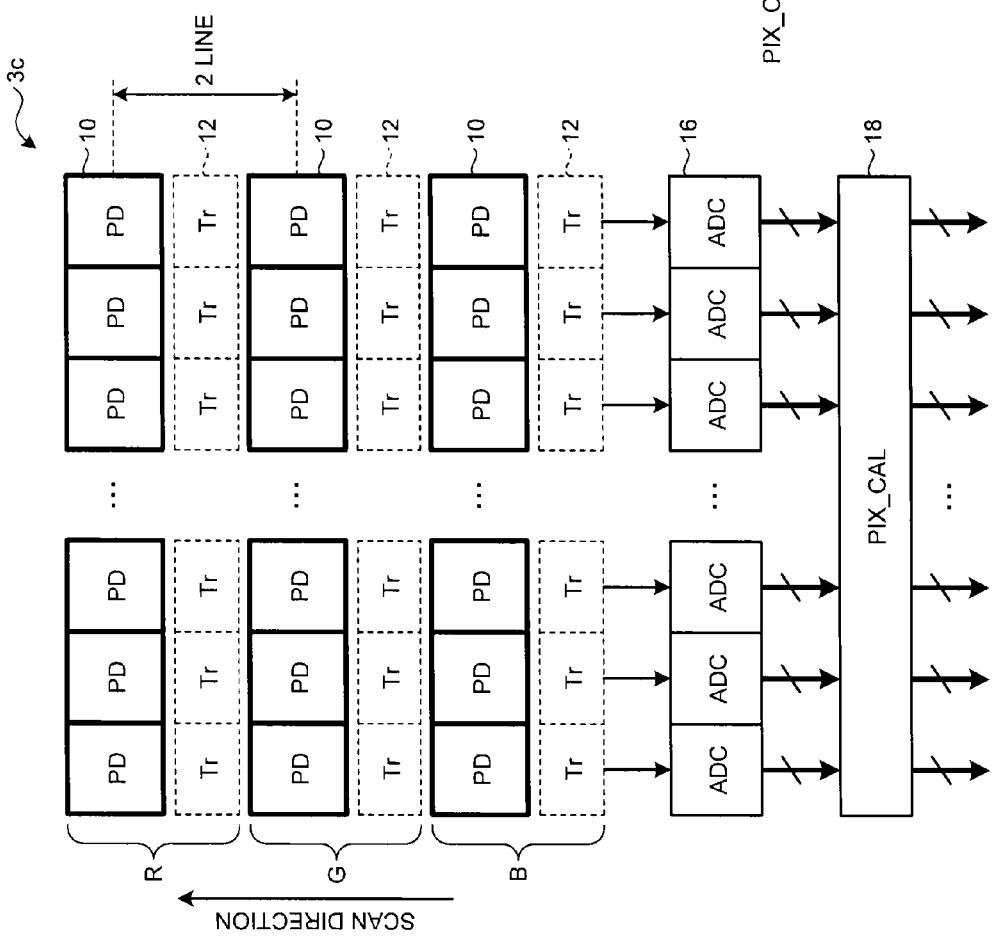

FIGS. 12A and 12B are diagrams that illustrate a configuration of a photoelectric conversion element 3c according to a third embodiment. In the first embodiment and the second embodiment, it is explained that, in each column, the difference in the exposure time is offset by the positional relationship between pixels in the sub-scanning direction. However, in actual image reading devices, even if the shift of the read positions among the pixels is not completely prevented, there are no problems for use if it can be reduced to an allowable level. Furthermore, as the difference in the exposure time is previously determined, the effect can be reduced also by control.

According to the third embodiment, a pixel correction unit 18 is provided in the photoelectric conversion element 3c to correct a pixel value, whereby the effect of the difference in the exposure timing can be reduced. As illustrated in FIG. 12A, the pixel correction unit (PIX_CAL) 18 is provided subsequent to the AD conversion unit 16. The pixel correction unit 18 corrects a pixel level (pixel data) in accordance with the difference in the exposure timing.

As illustrated in FIG. 12B, the pixel correction unit 18 includes a line memory 180 for each of R, G, and B, and it stores data corresponding to the total of two lines that includes a line subsequent to the target line, for example. Furthermore, the pixel correction unit 18 includes a correction calculation unit 182 for each of R, G, and B. The correction calculation unit 182 corrects pixel data by using data on the previous line or the subsequent line.

More specifically, as the difference in the exposure timing is about 0.33 lines, for example, the photoelectric conversion element 3c is exposed to light with a mixture in the ratio represented by the following Equation (1) for the G pixel data with respect to the R pixel data.

$$\text{The level of the target line:the level of the subsequent line=about } 0.67 : \text{about } 0.33 \quad (1)$$

To restore this, the photoelectric conversion element 3c performs correction by using the following Equation (2).

$$\text{The post-correction level of the target line=(the level of the target line–the level of the subsequent line} \times 0.33)/0.67 \quad (2)$$

Here, the B pixel has the same relationship with respect to the G pixel data and, if the relationship with respect to the R pixel is considered, the B pixel data is corrected by using the following Equations (3) and (4) with respect to the R pixel data, whereby the pixel data is restored.

$$\text{The level of the target line:the level of the subsequent line=about } 0.34 : \text{about } 0.66 \quad (3)$$

$$\text{The post-correction level of the target line=(the level of the target line–the level of the subsequent line} \times 0.66)/0.34 \quad (4)$$

Therefore, the photoelectric conversion element 3c makes it possible to reduce the effect of the difference among the R, G, and B exposure timings. In the above-described example, the G pixel data/the B pixel data is corrected by using the R pixel data as a reference. In this case, the R pixel data does not need to be corrected; however, in the example illustrated in FIG. 12B, the line memory 180 is provided for the R pixel data in order to adjust the timings of the images.

Furthermore, if a column includes multiple pixels for each of the R, G, and B like in the photoelectric conversion element 3b, the photoelectric conversion element 3c is configured to perform correction separately between Even/Odd. In the above-described example, the range of targets for correction calculation is the line subsequent to the target; however, if the calculation target is extended to the previous line, the previous and subsequent lines, or in the main-scanning direction (an adjacent pixel or successive pixels), correction can be performed with a higher accuracy.

Figure 13:
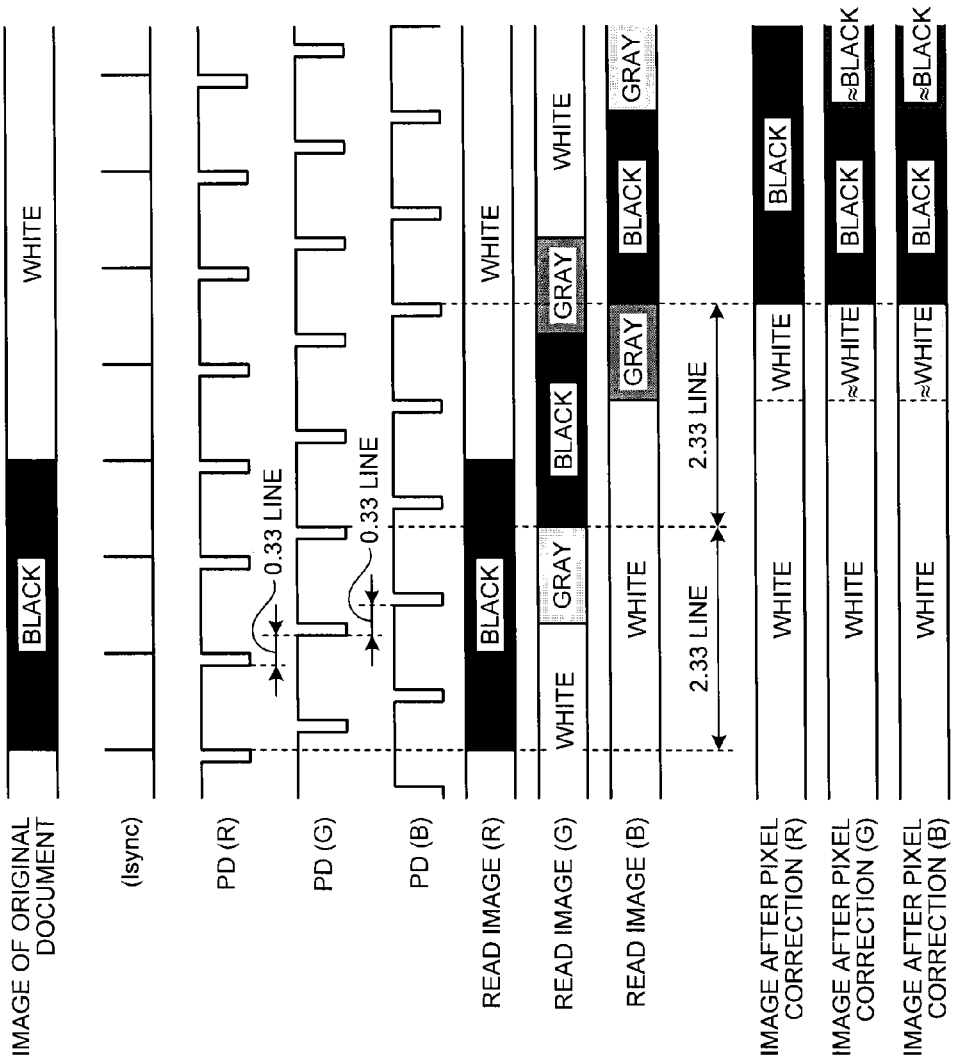
FIG. 13 is a diagram that illustrates an operation performed by the photoelectric conversion element to read an image.

FIG. 13 is a diagram that illustrates an operation performed by the photoelectric conversion element 3c to read an image. The example of FIG. 13 is the same as that illustrated in FIG. 6 in that the photoelectric conversion element 3c reads the shifted images due to the difference in the exposure timing among the R, G, and B light receiving elements 10 and reads an area near the boundary line between white and black as gray. However, after the photoelectric conversion element 3c performs a pixel correction, the data on the line that is just before the boundary between white→black and that is read as gray (originally read as white) is corrected by using black of the subsequent line so as to be almost white data. In the same manner, the data on the line that is just after the boundary between black→white and that is read as gray (that is to be read as black) is corrected by using white of the subsequent line so as to be almost black data. The line memory 180 is provided in the pixel correction unit 18 of the photoelectric conversion element 3c as illustrated in FIG. 12B; therefore, in FIG. 13, the design is made where the correction between lines is performed by using the line memory 180 (the pixel correction unit 18 also performs the correction between lines).

As described above, the photoelectric conversion element 3c performs image processing to reduce a shift of the read position, such as a color shift or a pixel shift, to an allowable level. Therefore, as is the case with the photoelectric conversion element 3a, it is made possible to omit an analog memory and prevent an increase in the size of a chip and an increase in the manufacturing costs while obtaining the performance equivalent to the one-shot exposure method.

Although the photoelectric conversion element 3c includes the line memories 180, the line memories 180 correspond to a few lines at largest, the size of the line memories 180 is much smaller than that of analog memories, and therefore they do not have a significant effect on the size of a chip. Furthermore, in a photoelectric conversion element that performs an AD conversion on each column, a parallel-serial conversion unit (a line memory, not illustrated) is provided subsequent to an AD converter; however, if the line memory 180 is shared with the parallel-serial conversion unit, the effect on the size of a chip can be almost eliminated.

Figure 14:
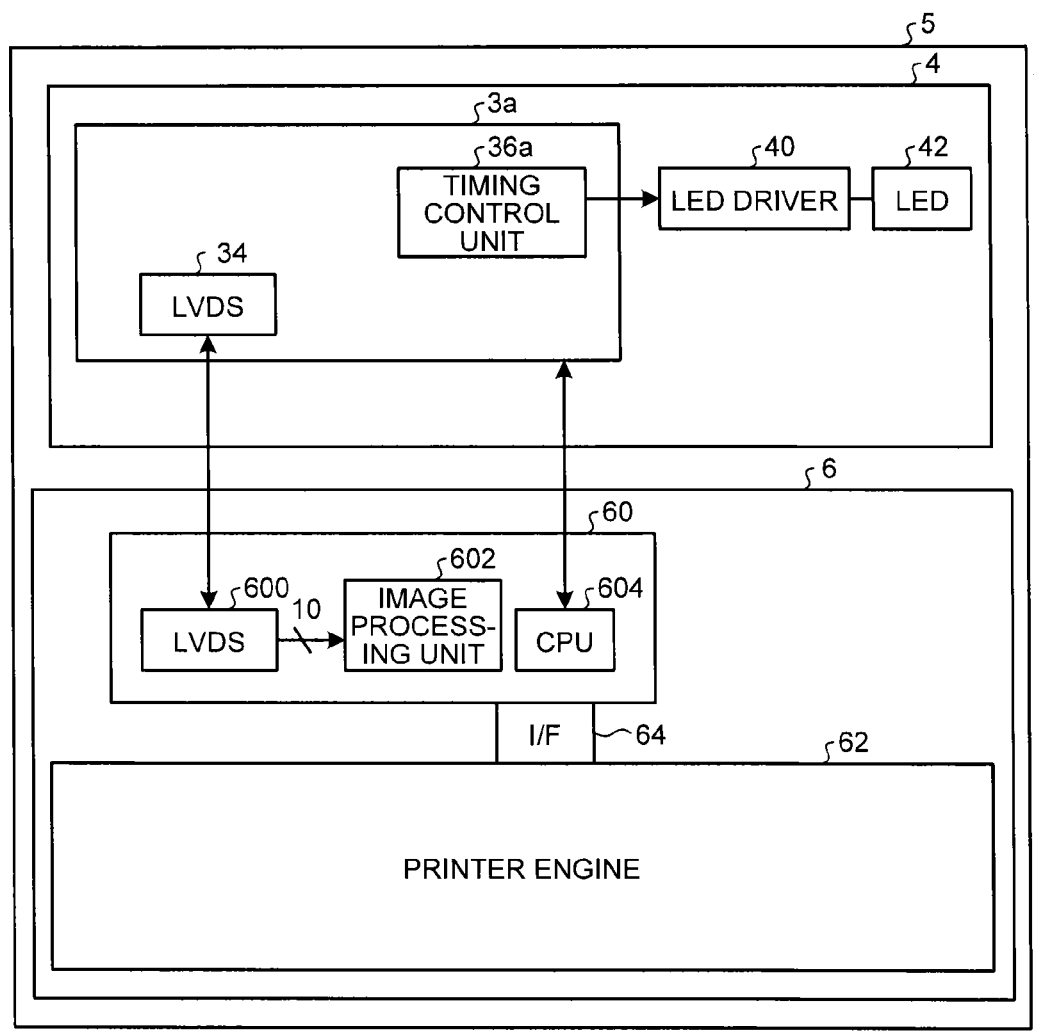
FIG. 14 is a diagram that illustrates the outline of an image forming apparatus that includes an image reading device that includes the photoelectric conversion element.

Next, an explanation is given of an image forming apparatus that includes an image reading device that includes any one of the photoelectric conversion elements 3a to 3c. FIG. 14 is a diagram that illustrates the outline of an image forming apparatus 5 that includes an image reading device 4 that includes any one of the photoelectric conversion elements 3a to 3c. The image forming apparatus 5 is, for example, a copier or a multifunction peripheral (MFP) that includes the image reading device 4 and an image forming unit 6.

The image reading device 4 includes, for example, the photoelectric conversion element 3a (or any one of the photoelectric conversion elements 3b and 3c), an LED driver 40, and an LED 42. The LED driver 40 drives the LED 42 in synchronization with a line synchronization signal (lsync) output from a timing control unit 36a and operations of the undepicted AD conversion units 16. The LED 42 emits light to an original document. In synchronization with the line synchronization signal (lsync) and the operations of the AD conversion units 16, the photoelectric conversion element 3a receives light that is reflected by an original document, and the undepicted light receiving elements 10 start to accumulate electric charge. After the photoelectric conversion element 3a performs a photoelectric conversion, an AD conversion, and a parallel-serial conversion, it outputs the image data to the image forming unit 6 using an LVDS 34.

The image forming unit 6 includes a processing unit 60 and a printer engine 62, and the processing unit 60 is connected to the printer engine 62 via an interface (I/F) 64.

The processing unit 60 includes an LVDS 600, an image processing unit 602, and a CPU 604. The CPU 604 controls each unit, such as the photoelectric conversion element 3a, that is included in the image forming apparatus 5.

The LVDS 34 outputs image data, a line synchronization signal (lsync), a transmission clock, or the like, to the LVDS 600 at the subsequent stage. The LVDS 600 converts the received image data, line synchronization signal, transmission clock, and the like, into parallel 10-bit data. The image processing unit 602 uses the converted 10-bit data to perform image processing and outputs the image data, and the like, to the printer engine 62. The printer engine 62 uses the received image data to perform printing.

As described above, if the photoelectric conversion element 3a (or any one of the photoelectric conversion elements 3b and 3c) is used in the image reading device, it is possible to provide the image reading device that prevents a read position shift, such as a color shift or a pixel shift.

Furthermore, the operation performed by the pixel correction unit 18 of the photoelectric conversion element 3c may be combined with a dot correction that is performed by the image processing unit 602 or may be performed as an extension of the function of a dot correction. During the dot correction, to adjust the effect due to a shift of a decimal number of lines in RGB, an image correction is performed to reduce the image difference among the RGB colors. Therefore, if there are provided, at the subsequent stage, a photoelectric conversion element that implements a sequential exposure method and performs an AD conversion on each group of pixels and a unit that corrects the difference in the exposure timing among the pixels in a column, such as the above-described dot correction, it is possible to produce the advantage similar to that of the photoelectric conversion element 3a or the photoelectric conversion element 3c. The above-described dot correction or the pixel correction that is performed as an extension thereof may be the same correction as that in the pixel correction unit 18 of the photoelectric conversion element 3c.

Modified Example

Figure 15B:
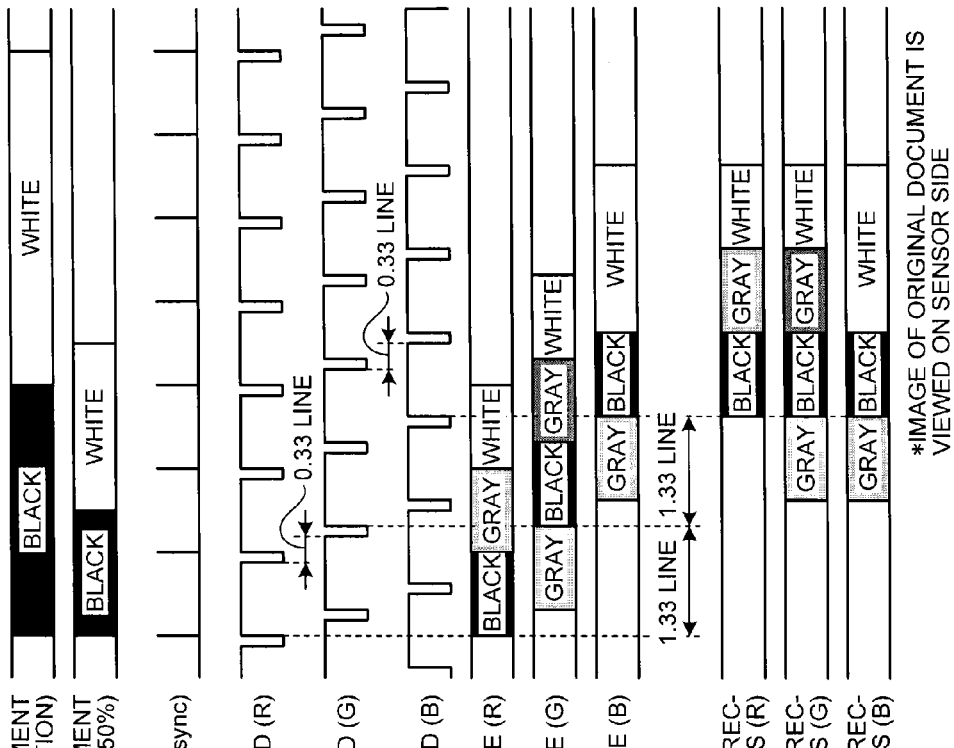
FIGS. 15A and 15B are diagrams that illustrate an operation of the photoelectric conversion element if the image reading device mechanically changes the reading linear velocity.
Figure 15A:
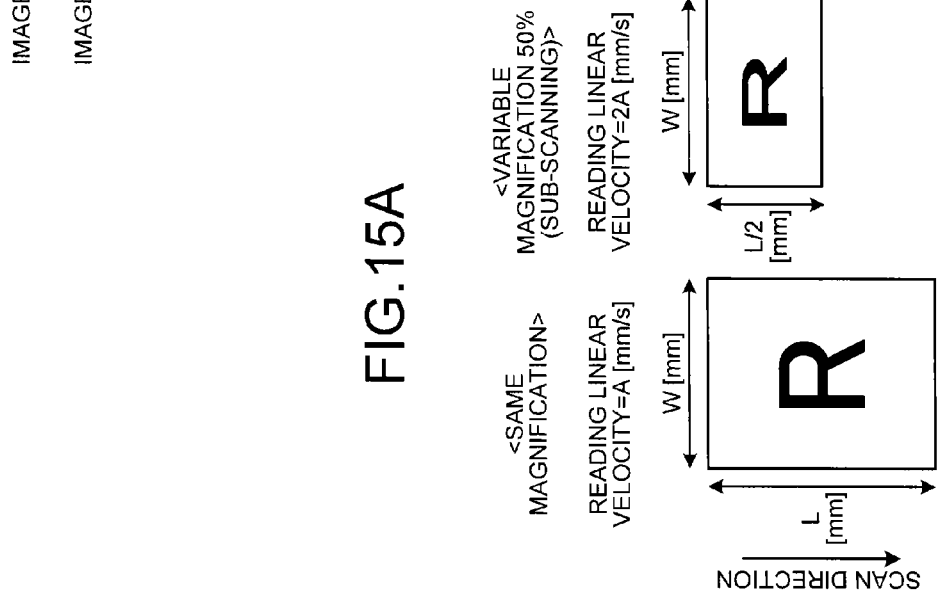

Next, an explanation is given of a modified example of a photoelectric conversion element according to an embodiment. FIGS. 15A and 15B are diagrams that illustrate an operation of the photoelectric conversion element if the image reading device mechanically changes the reading linear velocity. In the first embodiment to the third embodiment, an explanation is given of a case where an original document is read at the same magnification (100%). Sometimes, in the image reading device, if the variable magnification or the resolution is to be changed, an image is read with the changed reading linear velocity so that the variable magnification in the sub-scanning direction is changed.

FIG. 15A illustrates an example of the images that are read at the same magnification and at the variable magnification (50%). To read an original document that has a main-scanning width W [mm] and a sub-scanning width L [mm], for example, it is read with the main-scanning width W and the sub-scanning width L at the same magnification as illustrated at the left of FIG. 15A. Conversely, at the variable magnification (50%), the main-scanning width is W and the sub-scanning width is L/2, that is, it is reduced by ½, i.e., 50%, only in the sub-scanning direction. Here, with respect to the reading linear velocity (A [mm/s]) at the same magnification, the reading linear velocity at the variable magnification (50%) is twice as high, i.e., 2A [mm/s].

Specifically, for the variable magnification of 50%, the reading linear velocity is twice as high as that at the same magnification, and the line period is the same as that at the same magnification. Here, the velocity at which an original document is read at the variable magnification is twice as high, and the time it takes to read the original document is ½.

As the line period is constant, the number of lines included in the read image is ½ of that at the same magnification. Therefore, as the size in the sub-scanning direction is ½, the image that is reduced by 50% in the sub-scanning direction. It can be understood that, the reason why the number of lines is ½ is, not that the read lines are deleted, but that the average value of two lines at the same magnification constitutes data of one line.

Furthermore, ½ of the number of lines within a read image is equivalent to ½ of the reading resolution. Therefore, the magnification change by using the reading linear velocity is sometimes used not only in order to change the variable magnification but also in order to change the reading resolution. The magnification change by using the reading linear velocity is only for the sub-scanning direction but not for the main-scanning direction (the main-scanning direction is determined based on the number of physical pixels of a photoelectric conversion element); therefore, the magnification change in the main-scanning direction is usually performed during image processing (thinning+filtering process).

As described above, the variable magnification and the resolution can be changed by changing the reading linear velocity, while the relationship between one electric line, i.e., a line period and a reading width corresponding to one line on the surface of an original document is changed compared to that at the same magnification. For example, in the case of the resolution of 600 dpi for sub-scanning and the same magnification, the reading width on the surface of an original document corresponding to the line period of one line is about 42 μm. However, in the case of 600 dpi and the variable magnification of 50% (the same applies to the case of 300 dpi and the same magnification), the reading width on an original document corresponding to the line period of one line is twice, i.e., about 84 μm. The same idea can be applied to the surface of a photoelectric conversion element and, if the physical line interval on the surface of a photoelectric conversion element is one line (one pixel size), it corresponds to a shift corresponding to the line period of one line at the same magnification, while it corresponds to a shift corresponding to 0.5 lines at the variable magnification. That is, a conversion value of the physical distance to the line-period at the variable magnification varies in proportion to the variable magnification.

For example, as for the photoelectric conversion element 3a, the physical line interval (about 2.33 lines) among the RGB pixels becomes a shift of about 2.33 lines in the line period at the same magnification, while it corresponds to about 1.165 lines in the reading width on the surface of an original document at the variable magnification of 50%. As for the shift of the line (the shift of the read position on an original document) of about 1.165 lines, if the difference (about 0.33 lines) in the exposure timing is considered, the shift of the G/B pixel relative to the R pixel corresponds to about 0.835 lines/1.67 lines, i.e., a decimal number of lines. That is, during the operation illustrated in FIG. 15B, a color shift occurs as in the operation illustrated in FIG. 6.

The image of the original document illustrated in FIG. 15B is the image that is viewed on the photoelectric conversion element side (the sensor side) and, as the reading linear velocity is twice at the variable magnification of 50%, the size of the image of the original document in the sub-scanning direction seems to be ½.

Figure 16:
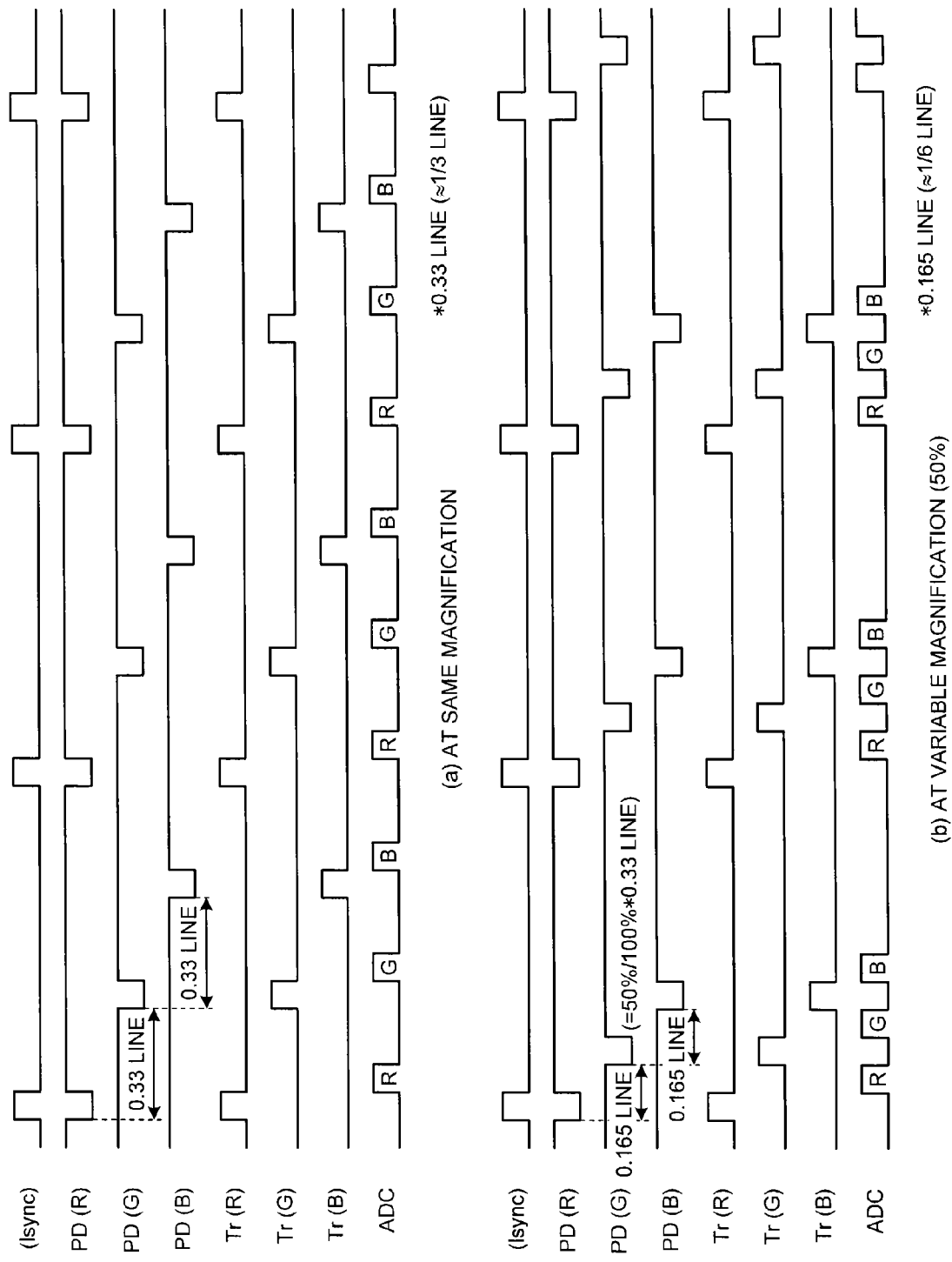
FIG. 16 is a timing chart that illustrates an operation performed by a photoelectric conversion element to prevent a color shift when the image reading device mechanically changes the magnification.

FIG. 16 is a timing charts that illustrate an operation performed by a photoelectric conversion element to prevent a color shift when the image reading device mechanically changes the magnification. If the variable magnification or the resolution is changed, the photoelectric conversion element sets the difference between the exposure timings of the pixels in a column in accordance with the reading linear velocity; thus, the problem of a color shift is prevented. FIG. 16(a) illustrates the exposure timings of the pixels in a column at the same magnification. FIG. 16(b) illustrates the exposure timings of the pixels in a column at the variable magnification (50%).

The difference between the exposure timings at the same magnification and at the variable magnification are represented by using the following Equation (5).

$$\text{The difference between the exposure timings at the variable magnification} = \text{the difference between the exposure timings at the same magnification} \times \text{the reading linear velocity ratio}(0.5 = A/2A \text{ [mm/s]}) \quad (5)$$

That is, as illustrated in FIG. 16(b), at the variable magnification (50%), the difference between the exposure timings of R-G or G-B should be set to about 0.165 lines, i.e., ½ of about 0.33 lines at the same magnification. Thus, in consideration of the difference (0.165 lines/0.33 lines) in the exposure timing that is calculated by using Equation (5), the shift of the read position of the G/B pixel with respect to the R pixel at the variable magnification of 50% illustrated in FIGS. 15A and 15B finally become 1 line/2 lines, and can make the shift be an integral number of lines.

In this way, even if the reading linear velocity is changed when the reading variable magnification or the resolution is changed, a color shift or a read position shift can be prevented. Furthermore, the same holds for a case where a column includes multiple pixels for each of R, G, and B; for example, if it includes two pixels for each of R, G, and B as illustrated in FIG. 9, the difference in the exposure timing among the pixels may be about 0.165 lines at the same magnification while it may be half, i.e., about 0.0825 lines at the variable magnification of 50%. FIG. 16(a) represents the difference between the exposure timings at the same magnification, and it is the same as that of the operation illustrated in FIG. 5.

Figure 17:
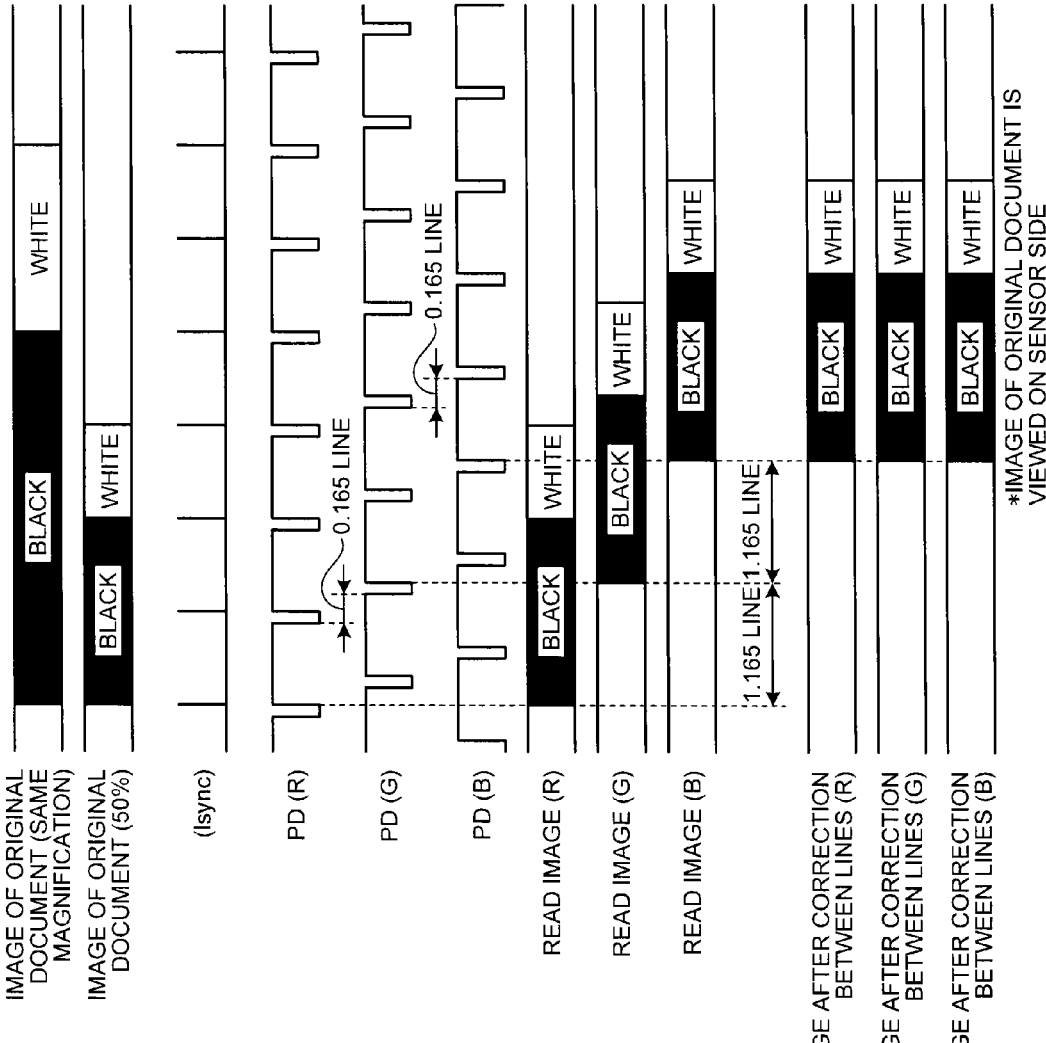
FIG. 17 is a diagram that illustrates a read image where a color shift is prevented when the image reading device mechanically changes the magnification.

FIG. 17 is a diagram that illustrates a read image where a color shift is prevented when the image reading device mechanically changes the magnification. The difference in the exposure time between R-G or G-B at the variable magnification (50%) is 0.165 lines, i.e., ½ relative to that at the same magnification (0.33 lines); thus, the shift of the physical read position of the G/B pixel with respect to the R pixel can be offset by the difference in the exposure timing. As a result, the shift of the read position of the G/B pixel with respect to the R pixel can be finally made an integral number of lines, i.e., 1 line/2 lines; thus, it is possible to prevent a color shift of the image obtained after the correction between lines.

An embodiment provides an advantage that both a reduction in the size of an element and a prevention of a degradation in the image quality can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A photoelectric conversion element comprising:
   a plurality of light receiving elements that are arranged in a main-scanning direction, and that are arranged in a sub-scanning direction according to colors of light to be received, and each of the plurality of light receiving elements accumulating electric charge due to light exposure during a line period while being moved relative to an object; and a plurality of AD converters, implemented by circuitry, that convert analog signals that indicate quantities of said electric charge accumulated in the light receiving elements into digital signals, each of the plurality of AD converters being provided for each group including a predetermined number light receiving elements out of the plurality of light receiving elements, the predetermined number of light receiving elements being arranged at different positions in the sub-scanning direction, wherein the predetermined number of light receiving elements of each group are exposed to light at different timings and accumulate said electric charge, and each of the plurality of AD converters converts the analog signals into the digital signals in an order in which the predetermined number of light receiving elements are exposed to light, and the photoelectric conversion element further comprising a corrector that reduces influence of a first difference in the sub-scanning direction between positions of the object that face the predetermined number of light receiving elements of each group when being exposed to light, the first difference being smaller than a length by which each of the plurality of light receiving elements is moved relative to the object during said line period.

2. The photoelectric conversion element according to claim 1, wherein the predetermined number of light receiving elements are arranged at such an interval that a second difference in the sub-scanning direction between the positions of the object that face the predetermined number of light receiving elements when being exposed to light in a same line period is an integral multiple of the length by which each of the plurality of light receiving elements is moved relative to the object during said line period.

3. The photoelectric conversion element according to claim 1, wherein the corrector, implemented by the circuitry, corrects a digital signal that is obtained by a conversion by an AD converter based on the first difference and digital signals obtained by conversion of analog signals indicating quantities of said electric charge accumulated in a light receiving element at consecutive line periods.

4. The photoelectric conversion element according to claim 1, wherein the predetermined number of light receiving elements are exposed to light at the different timings based on the colors of light to be received by each of the predetermined number of light receiving elements.

5. The photoelectric conversion element according to claim 1, wherein an interval between the predetermined number of light receiving elements of each group is set based on the different timings at which each of the predetermined number of light receiving elements of each group is exposed to light.

6. The photoelectric conversion element according to claim 1, wherein the plurality of light receiving elements are photodiodes.

7. The photoelectric conversion element according to claim 1, further comprising a plurality of pixel circuits, implemented by the circuitry, that receive voltage image signals, the voltage image signals corresponding to a charge-voltage conversion of said electric charge accumulated by the plurality of light receiving elements.

8. The photoelectric conversion element according to claim 7, wherein each of the plurality of pixel circuits includes a switch or a buffer to transfer the voltage image signals to the plurality of AD converters.

9. An imaging device comprising a photoelectric conversion element, wherein the photoelectric conversion element comprises:

a plurality of light receiving elements that are arranged in a main-scanning direction, and that are arranged in a sub-scanning direction according to colors of light to be received, and each of the plurality of light receiving elements accumulating electric charge due to light exposure during a line period while being moved relative to an object; and a plurality of AD converters, implemented by circuitry, that convert analog signals that indicate quantities of said electric charge accumulated in the light receiving elements into digital signals, each of the plurality of AD converters being provided for each group including a predetermined number light receiving elements out of the plurality of light receiving elements, the predetermined number of light receiving elements being arranged at different positions in the sub-scanning direction, the predetermined number of light receiving elements of each group are exposed to light at different timings and accumulate said electric charge, and each of the plurality of AD converters converts the analog signals into the digital signals in an order in which the predetermined number of light receiving elements are exposed to light, and the photoelectric conversion element further comprising a corrector that reduces influence of a difference in the sub-scanning direction between positions of the object that face the predetermined number of light receiving elements of each group when being exposed to light, the difference being smaller than a length by which each of the plurality of light receiving elements is moved relative to the object during said line period.

10. The imaging device according to claim 9, further comprising a controller that controls a difference between the different timings when the predetermined number of light receiving elements of each group are exposed to light, in accordance with a reading linear velocity.

11. An image forming apparatus comprising:

the imaging device according to claim 9; and an image former that forms an image that is read by the imaging device.

12. An imaging method comprising:

causing a plurality of light receiving elements to be exposed to light to accumulate electric charge while moving the plurality of light receiving elements relative to an object such that each group of a predetermined number of light receiving elements out of the plurality of light receiving elements are exposed to light at different timings, the light receiving elements being arranged in a main-scanning direction and being arranged in the sub-scanning direction according to colors of light to be received, the plurality of light receiving elements being arranged at different positions in the sub-scanning direction;

converting, by using each of a plurality of AD converters, analog signals that indicate quantities of said electric charge accumulated in the predetermined number of light receiving elements of each group into digital signals in an order in which the predetermined number of light receiving elements are exposed to light at the different timings; and performing correction so as to reduce influence of a difference in the sub-scanning direction between positions of the object that face the predetermined number of light receiving elements of each group when being exposed to light, the difference being smaller than a length by which each of the plurality of light receiving elements is moved relative to the object during one line period.

* * * * *